(12) United States Patent
Sharma et al.

(10) Patent No.: US 12,342,407 B2
(45) Date of Patent: Jun. 24, 2025

(54) ARCHITECTURE FOR MULTI RADIO MULTI CONNECTIVITY NETWORK SYSTEM

(71) Applicant: Samsung Electronics Co., Ltd., Suwon-si (KR)

(72) Inventors: Neha Sharma, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 17/556,144

(22) Filed: Dec. 20, 2021

(65) Prior Publication Data

US 2022/0117028 A1    Apr. 14, 2022

Related U.S. Application Data

(63) Continuation of application No. PCT/KR2020/018260, filed on Dec. 14, 2020.

(30) Foreign Application Priority Data

Dec. 13, 2019  (IN) .............................. 201941051859
Dec. 9, 2020   (IN) .............................. 2019 41051859

(51) Int. Cl.
*H04W 76/27*    (2018.01)
*H04W 36/00*    (2009.01)

(52) U.S. Cl.
CPC ...... *H04W 76/27* (2018.02); *H04W 36/00698* (2023.05)

(58) Field of Classification Search
CPC ........... H04W 76/20; H04W 36/00698; H04W 76/16; H04W 76/27
See application file for complete search history.

(56) References Cited

U.S. PATENT DOCUMENTS 10,455,552 B2  10/2019 Jang et al.
10,721,653 B2   7/2020 Futaki et al.
(Continued)

FOREIGN PATENT DOCUMENTS

EP    3 506 718 A1    7/2019
WO    2015/009075 A1  1/2015
WO    2015/015300 A2  2/2015

OTHER PUBLICATIONS

3GPP TS 36.300 V15.7.0 , 3GPP TS 36.300 V15.7.0 , Technical Specification Group Radio Access Network, Evolved Universal Terrestrial Radio Access (E-UTRA) , and Evolved Universal Terrestrial Radio Access Network , (E-UTRAN), Overall description, Stage 2, (Release 15), Sep. 2019.

(Continued)

*Primary Examiner* — Mansour Oveissi
*Assistant Examiner* — David M Oveissi
(74) *Attorney, Agent, or Firm* — Jefferson IP Law, LLP

(57) ABSTRACT

A design and architecture for a Multi-Radio Multi-Connectivity (MR-MC) network system is provided. The method includes providing and defining a role of a Master Node (MN), a Secondary Node (SN), a Cloud/Centralized Radio Access Network (C-RAN), a Control Plane (CP) and a User Plane (UP) in the MR-MC network system. Furthermore, the method includes determining a capability of a UE in the MR-MC network system. Furthermore, the method includes determining Radio Access Technology (RAT) measurements associated with the MN, an SN1, and an SN2 in the MR-MC network system. Furthermore, the method includes configuring functionalities of the MN, an SN1, and an SN2 based on the capability of the UE and the RAT measurements. Furthermore, the method includes sending an activation/deactivation command for the SN in the MR-MC network system.

6 Claims, 19 Drawing Sheets

(56) References Cited

U.S. PATENT DOCUMENTS

| 2015/0092707 | A1* | 4/2015 | Kwon | .................. | H04W 76/38 |
| | | | | | 370/329 |
| 2015/0094073 | A1 | 4/2015 | Peng | | |
| 2017/0231011 | A1* | 8/2017 | Park | .................. | H04W 72/0446 |
| 2018/0110029 | A1 | 4/2018 | Kim et al. | | |
| 2020/0154499 | A1* | 5/2020 | Futaki | .................. | H04W 76/15 |

OTHER PUBLICATIONS

3GPP TS 37.340 V15.7.0, 3rd Generation Partnership Project, Technical Specification Group Radio Access Network, Evolved Universal Terrestrial Radio Access (E-UTRA) and NR, Multi-connectivity, Stage 2, (Release 15), Sep. 2019.

International Search Report with Written Opinion dated Mar. 19, 2021, issued in International Patent Application No. PCT/KR2020/018260.

\* cited by examiner

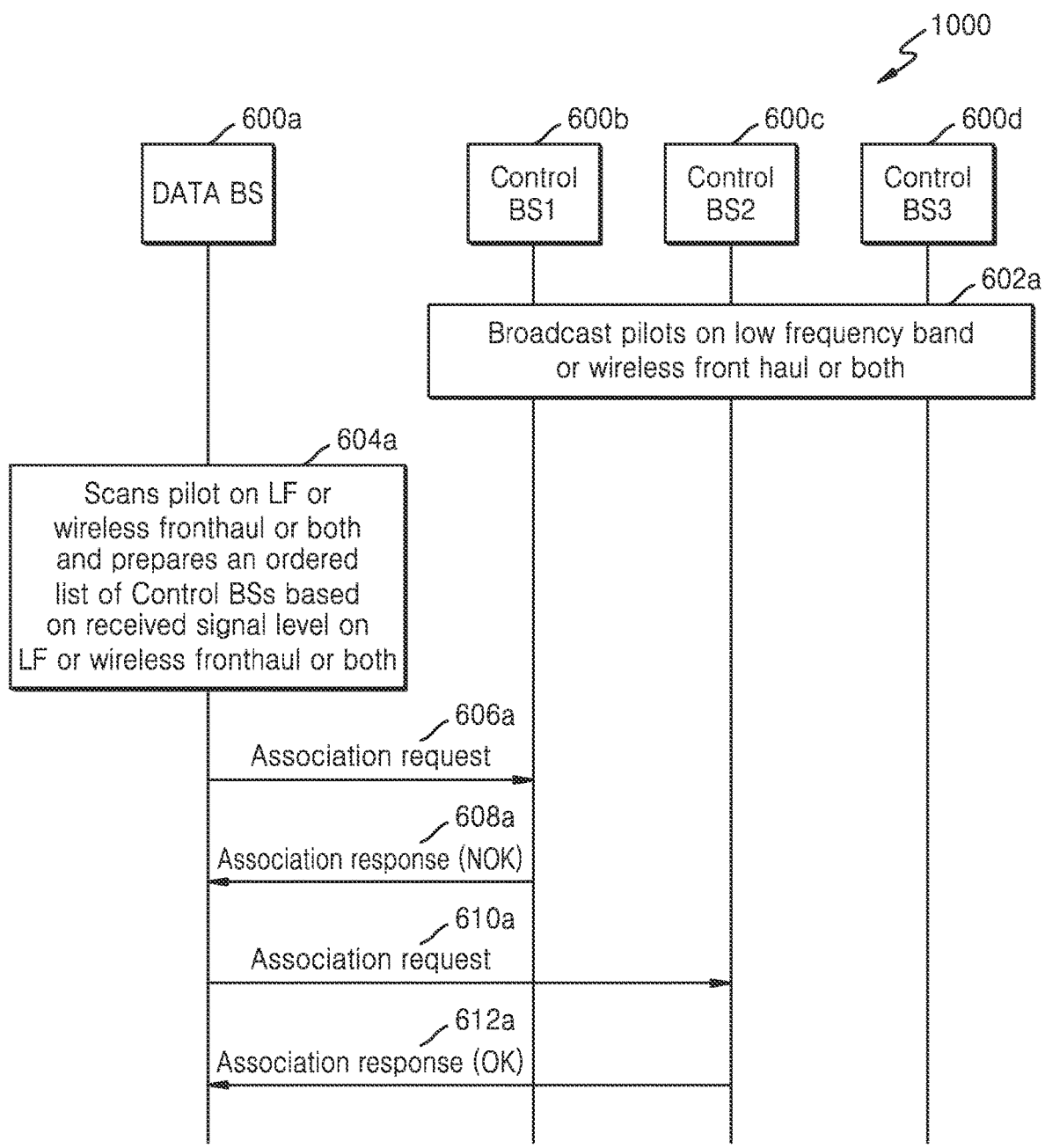

ARCHITECTURE FOR MULTI RADIO MULTI CONNECTIVITY NETWORK SYSTEM

CROSS-REFERENCE TO RELATED APPLICATION(S)

This application is a continuation application, claiming priority under § 365(c), of an International application No. PCT/KR2020/018260, filed on Dec. 14, 2020, which is based on and claims priority of an Indian provisional patent application number 201941051859, filed on Dec. 13, 2019, in the Indian Patent Office, and of an Indian Complete patent application number 201941051859, filed on Dec. 9, 2020, in the Indian Patent Office, the disclosure of which is incorporated by reference herein in its entirety.

BACKGROUND

1. Field

The disclosure relates to wireless communication. More particularly, the disclosure relates to protocol architecture and design for establishing a Multi-Radio Multi-Connectivity (MR-MC) network system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have recently been researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a design and architecture for a Multi-Radio Multi-Connectivity (MR-MC) network system. A method may include providing and defining a role of a Master Node (MN), a Secondary Node (SN), a Cloud/Centralized Radio Access Network (C-RAN), a Control Plane (CP), and a User Plane (UP), in the MR-MC network system. Furthermore, the method includes determining a capability of a UE in the MR-MC network system. Furthermore, the method includes determining Radio Access Technology (RAT) measurements associated with the MN, a first secondary node (SN1), and a second secondary node (SN2) in the MR-MC network system. Furthermore, the method includes configuring functionalities of the MN, an SN1, and an SN2 based on the capability of the UE and the RAT measurements. Furthermore, the method includes sending an activation/deactivation command for the SN in the MR-MC network system.

Another aspect of the disclosure is to provide a design and architecture for an MR-MC network system. The MR-MC network system configured a user equipment (UE) to utilize radio resources provided by three or more distinct schedulers, located in three or more different network (NW) nodes connected via a non-ideal backhaul. In the MR-MC network system as multiple radios are involved so there is a need to define the role and design for each radio. Furthermore, there is also a need to define a CP and a UP aspects in the MR-MC network system. Furthermore, in the MR-MC network system as multiple radios have been involved so there is a need to define the procedure to handle these radios or nodes.

Additional aspects will be set forth in part in the description which follows and, in part, will be apparent from the description, or may be learned by practice of the presented embodiments.

In accordance with an aspect of the disclosure, an MR-MC network system is provided. The MR-MC network system includes a C-RAN, an MN connected to the C-RAN and the MN is configured to communicate with a UE through the UP and the CP, a first secondary node (SN1) connected to the MN, the C-RAN, and the UE and the first SN1 is configured to communicate with the UE through the UP and the CP, and a second secondary node (SN2) connected to the MN and the UE, and the SN2 is configured to communicate with the UE through the UP and the CP. The SN2 can be connected to the SN1 which act as MN for SN2 and the UE Control and signalling plane messages generated by the SN1 and the SN2 are routed through at least one of the MN and the C-RAN.

In accordance with another aspect of the disclosure, C-RAN functionalities are provided. The C-RAN functionalities include dynamic switching between the MN, the SN1, and the SN2 in the MR-MC network system, determining functionalities of the MN, the SN1, and the SN2 in the MR-MC network system, determining path of the UP and the CP associated with the UE in the MR-MC network system, mapping services associated with the MN, the SN1, and the SN2 in the MR-MC network system, interchanging between the MN, the SN1, and the SN2 based on a data requirement, a type of service, a load condition, a signal condition associated with the UE in the MR-MC network system, handling errors of the MN, the SN1, and the SN2 in the MR-MC network system, and performing at least one action associated with the MN, the SN1, and the SN2 in the MR-MC network system.

In an embodiment, the at least one action may include activating/deactivating at least one of the SN1, and the SN2 based on the data requirement, the type of service, the load condition, the signal condition associated with the UE in the MR-MC network system, and modifying the at least one of the MN, the SN1, and the SN2 based on the data requirement, the type of service, the load condition, the signal condition associated with the UE in the MR-MC network system.

In an embodiment, the control and signalling plane messages generated by the SN1 are routed by the MN to the C-RAN and the control and signalling plane messages generated by the SN2 are routed by one of the SN1 and the MN to the C-RAN.

In an embodiment, the control and signalling plane messages generated by the SN1 may be routed directly to the C-RAN and the control and signalling plane messages generated by the SN2 may be routed by one of the SN1 and the MN to the C-RAN.

In an embodiment, the C-RAN may receive the UE capability support indication from the UE, wherein the capability support indication includes information on UE capability supporting at least one of the SN1 and the SN2.

In an embodiment, the C-RAN may send a Medium Access Control (MAC) Control Element (MAC-CE) command to the UE to perform one of activating and deactivating one of the SN1 and the SN2

In an embodiment, the C-RAN may send a Radio Resource Control (RRC) message to the UE to perform one of activating and deactivating one of the SN1 and the SN2.

In an embodiment, the C-RAN may use a timer-based mechanism to perform one of activating and deactivating one of the SN1 and the SN2.

In an embodiment, handover decision, configuration of carrier aggregation, coordinated multipoint (CoMP) transmission and reception may be controlled by C-RAN or Master Node in multi RAT multi cell connectivity network system.

In accordance with another aspect of the disclosure, a method for establishing an MR-MC network is provided. The method includes determining, by a C-RAN, a capability of a UE in the MR-MC network system, wherein the MR-MC network system may include an MN, an SN1, and an SN2. Further, the method includes determining, by the C-RAN, RAT measurements associated with the MN, the SN1, and the SN2 in the MR-MC network system. Further, the method may include configuring, by the C-RAN, functionalities of the MN, the SN1, and the SN2 based on the capability of the UE and the RAT measurements.

In an embodiment, the method may further include configuring, by the C-RAN, the MN to communicate with the UE through a user plane (UP) and a control plane (CP), wherein the MN connected to the C-RAN, configuring, by the C-RAN, the SN1 to communicate with the UE through the UP and the CP, wherein the SN1 is connected to the MN and the C-RAN, and configuring, by the C-RAN, the SN2 to communicate with the UE through the UP and the CP, wherein the SN2 is connected to the MN and the UE. Control and signalling plane messages generated by the SN1 and the SN2 may be routed through at least one of the MN 200 of FIG. 2 and the C-RAN.

In an embodiment, the functionalities may include dynamic switching between the MN, the SN1, and the SN2 in the MR-MC network system, determining functionalities of the MN, the SN1, and the SN2 in the MR-MC network system, determining path of the UP and the CP associated with the UE in the MR-MC network system, mapping services associated with the MN, the SN1, and the SN2 in the MR-MC network system, interchanging between the MN, the SN1, and the SN2 based on a data requirement, a type of service, a load condition, a signal condition associated with the UE in the MR-MC network system, handling errors of the MN, the SN1, and the SN2 in the MR-MC network system, and performing at least one action associated with the MN, the SN1, and the SN2 in the MR-MC network system.

In an embodiment, the at least one action may include activating/deactivating at least one of the SN1, and the SN2 based on the data requirement, the type of service, the load condition, the signal condition associated with the UE in the MR-MC network system, and modifying the at least one of the MN, the SN1, and the SN2 based on the data requirement, the type of service, the load condition, the signal condition associated with the UE in the MR-MC network system.

In an embodiment, the control and signalling plane messages generated by the SN1 may be routed by the MN 200 of FIG. 7 to the C-RAN 100 and the control and signalling plane messages generated by the SN2 300*b* may be routed by one of the SN1 300*a* and the MN 200 to the C-RAN.

In an embodiment, the control and signalling plane messages generated by the SN1 may be routed directly to the C-RAN and the control and signalling plane messages generated by the SN2 are routed by one of the SN1 and the MN to the C-RAN.

In an embodiment, the capability of the UE may include information on the UE capability supporting at least one of the SN1 and the SN2.

In an embodiment, the C-RAN may send a MAC Control Element (MAC-CE) command to the UE to perform one of activating and deactivating one of the SN1 and the SN2.

In an embodiment, the C-RAN may send a Radio Resource Control (RRC) message to the UE to perform one of activating and deactivating one of the SN1 and the SN2.

In an embodiment, the C-RAN uses a timer-based mechanism to perform one of activating and deactivating one of the SN1 and the SN2.

In an embodiment, the MR-MC network system may include a C-RAN, at least one master node (MN) connected to the C-RAN and the at least one MN is configured to communicate with a UE through the UP and the CP, at least one secondary node (SN) connected to the at least one MN, the C-RAN, and the UE and the at least one SN is configured to communicate with the UE through the UP and the CP. Control and signalling plane messages generated by the at least one SN are routed through at least one of the at least one MN and the C-RAN.

In an embodiment, the C-RAN functionalities may include performing at least one of dynamic switching between the at least one MN, the at least one SN in the MR-MC network system, determining functionalities of the at least one MN, the at least one SN in the MR-MC network system, determining path of the UP and the CP associated with the UE in the MR-MC network system, mapping services associated with the at least one MN, the at least one SN in the MR-MC network system, interchanging between the at least one MN, the at least one SN based on a data requirement, a type of service, a load condition, a signal condition associated with the UE in the MR-MC network system, handling errors of the at least one MN, the at least one SN1 in the MR-MC network system, and performing at least one action associated with the at least one MN, the at least one SN in the MR-MC network system.

In an embodiment, the control and signalling plane messages generated by the at least one SN are routed by the at least one MN to the C-RAN and the control and signalling plane messages generated by the at least one SN and the at least one MN to the C-RAN.

In an embodiment, the control and signalling plane messages generated by the at least one SN are routed directly to the C-RAN and the control and signalling plane messages generated by the at least one SN are routed by the at least one MN to the C-RAN.

In an embodiment, the C-RAN may receive the UE capability support indication from the UE, wherein the capability support indication includes information on UE capability supporting at least one the SN.

In an embodiment, the C-RAN may send a MAC Control Element (MAC-CE) command to the UE to perform one of activating and deactivating the at least one SN.

In an embodiment, the C-RAN may send a Radio Resource Control (RRC) message to the UE to perform one of activating and deactivating the at least one SN.

In an embodiment, the C-RAN may use a timer-based mechanism to perform one of activating and deactivating the at least one SN.

In an embodiment, the at least one action may include performing at least one of activating at least one the SN based on the data requirement, the type of service, the load condition, the signal condition associated with the UE in the MR-MC network system, deactivating the at least one of the SN based on the data requirement, the type of service, the load condition, the signal condition associated with the UE in the MR-MC network system, and modifying the at least one of the at least one MN, the at least one SN based on the data requirement, the type of service, the load condition, the signal condition associated with the UE in the MR-MC network system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B, and 6C are sequence diagrams illustrating various operations for an association between a Data Base station (BS) and Control BS(s), according to various embodiments of the disclosure;

DETAILED DESCRIPTION

Figure 1:
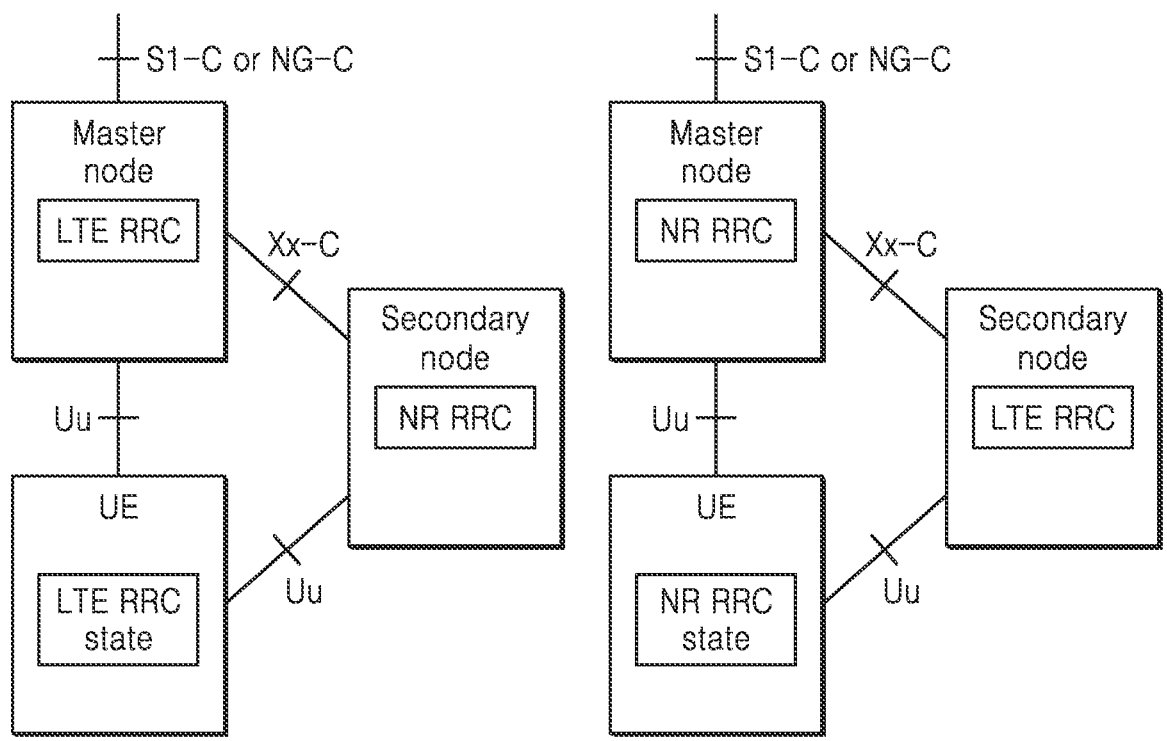
FIG. 1 illustrates a CP architecture for an MR-DC network system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1, 2, 3, 4, 5, 6A, 6B, 6C, 7, 8, 9A, 9B, 10, 11, 12, 13, 14, 15 and 16, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "processor" or "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances, such definitions apply to prior as well as future uses of such defined words and phrases.

Accordingly, the embodiments herein provide a design and architecture for an MR-MC network system. The MR-MC or Multi-RAT Multi-cell Connectivity (MR-MC) cellular system is an operation whereby a UE in connected is configured to utilize radio resources provided by three or more distinct schedulers, located in three or more different NW nodes connected via a non-ideal backhaul. These multiple radios can be Long-Term Evolution (LTE) and/or enhanced LTE (eLTE) and/or 5G NR and/or wireless LAN (WLAN) and/or 6G THz and/or HF Millimeter Waves (mmW) and/or LF mmW and/or Visible light communication (VLC) and/or Infrared waves and/or ultra-violet or any other frequency band or system which can be used in wireless technologies. The different frequency range of these radios or RAT (Radio Access Technology) could be, 1. NR Rel-15 defined FR1 (410 MHz-7.125 GHz) & FR2 (24.25 GHz-52.6 GHz)
2. High-frequency mmW which can be >52.6 GHz
3. Low-frequency mmW which can be less than 52.6 GHz or 28 GHz
4. 6G THz can be between 100 GHz to 300 GHz or from 60 GHz onwards
5. LTE, NR, eLTE, WLAN can support the frequency range which can be less than 6 GHz
6. VLC can be in the range of 430 THz to 730 THz
7. Infrared and ultra-violet can be above 3 THz.

The MR-MC can be a combination of 3 RATs or more (e.g., LTE and/or eLTE and/or 5G NR and/or WLAN and/or 6 g THz and/or HF mmW and/or LF mmW and/or VLC) which simultaneously provide connectivity to a device or a UE. As an example, the 3 RATs can be a combination of one RAT providing NR access, the other one providing either E-UTRA or NR access, and the third RAT can be providing access of 6 g THz or VLC. The RAT combination can be from any radio technology as mentioned above and no active RATs in the MR-MC can be two or three or more. This disclosure is explained by considering three active RAT in the MR-MC which can be a combination of any frequency range as mentioned above.

The procedure explained in the method is applicable for 2 active or 3 or 4 active RAT or more. The method is applicable for 5G, beyond 5G and 6G systems, and beyond 6G. MR-MC can be set of different radio or of the same radio having different frequency range say NR having less than 6 GHz frequency band, low mmW frequency band, and high mmW frequency band combination. The methods can also be applicable for dual connectivity mode of operation which can be between 6G THz frequencies or between 6G and 5G radio frequency band and any other combination of frequency as mentioned above.

The 5G wireless communication system have been implemented not only in lower frequency bands but also in higher frequency (mm Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of 5th generation wireless communication system. In addition, the 5th generation wireless communication system has address different use cases having quite different requirements in terms of data rate, latency, reliability, mobility etc.

For the next generation of wireless communication systems i.e., 6G, beyond 5G various technologies have been under consideration like VLC i.e. Visible Light communication, Terahertz band (THz) i.e. Frequencies from 100 GHz to 3 THz, Infrared wave and Ultra violet wave etc. Among all these technologies the THz band is envisioned as a potential candidate for a diverse range of applications, which exist within the nano, micro as well as macro scales. THz band is able to provide Tbps data rates, and minimal latency but due to high path loss, heavy shadowing and rain attenuation, reliable transmission at higher frequencies is one of the key issues that need to be overcome in order to make the THz band wave systems a practical reality. The lower frequencies in cellular band having robust link characteristics can be utilized together with higher frequencies in mm Wave or THz band to overcome the reliability issues in next generation wireless system.

As described in 3GPP TS 36.300, Dual Connectivity (DC) is a generalization of an Intra-Evolved Universal Terrestrial Radio Access (E-UTRA) DC, where a multiple Receiver (Rx)/Transmitter (Tx) of a User Equipment (UE) configured to utilize radio resources provided by two distinct schedulers in two different nodes connected via a non-ideal backhaul. Out of two different nodes, one is providing an E-UTRA access and another one is providing a New Radio (NR) access. One scheduler is located in a Master Node (MN) and the other scheduler is located in a Secondary Node (SN). The MN and the SN are connected via a network interface and the MN is connected to a core network.

As described in 3GPP TS 37.340, an Evolved-UMTS Terrestrial Radio Access Network (E-UTRAN) supports the Multi Radio Access technology dual connectivity (MR-DC) via an E-UTRA-NR Dual Connectivity (EN-DC), in which the UE is connected to one Evolved Node B (eNB) that acts as the MN and one gNodeB (gNB) that acts as the SN. The eNB is connected to an Evolved Packet Core (EPC) and the gNB is connected to the eNB via an X2 interface.

Further, Next Generation Radio Access technology Network (NG-RAN) supports Next Generation dual connectivity (NGEN-DC), in which the UE is connected to one eNB that acts as the MN and one gNB that acts as the SN. The eNB or e-LTE is connected to a 5G core network (5GC) and the gNB is connected to the eNB via an Xn interface. Further, the NG-RAN supports NR-E-UTRA Dual Connectivity (NE-DC), in which the UE is connected to one gNB that acts as the MN and one eNB that acts as the SN. The gNB is connected to the 5GC and the eNB is connected to the gNB via the Xn interface.

Multi-RAT Dual Connectivity (MR-DC) concept enables the UE to configure with both LTE and NR system. There is need to have similar concept for 6G system as standalone deployments may not be feasible due to THz band channel characteristics. UE and NW have should have option to perform flexible and seamless RAT selection between 6G, 5G and 4G system. Operators may want benefit from the existing NR or LTE deployments when deploying 6G THz in terms of aggregation, coverage, mobility and load balancing, so there is need to define to new system of multi radio multi connectivity system (MR-MC).

Further, the existing systems do not provide a solution for the MR-MC network system, whereby the UE is configured to utilize radio resources provided by three or more distinct schedulers, located in three or more different Network (NW) nodes connected via the non-ideal backhaul. The existing systems have a limitation where the UE is configured to utilize radio resources provided by two distinct schedulers in two different nodes connected via the non-ideal backhaul. So, we need a solution for the MR-MC network system as multiple radios are involved and have to define a role and design for each node and/or radio. Further, there is also a need to define a Control Plane (CP) and User Plane (UP)

aspects in the MR-MC network system. Further, there is also a need to define a procedure to handle these radios and/or nodes in the MR-MC network system.

The principal object of the embodiments herein is to establish an MR-MC network architecture by defining a role of an MN, a SN1, a SN2, a C-RAN, radio interface(s), a CP, and a UP of the MR-MC network system.

Another object of the embodiment herein is to handle a configuration of the MN and multiple secondary nodes handover decision, configuration of carrier aggregation, coordinated multipoint (CoMP) transmission and reception.

Another object of the embodiment herein is to generate an activation/deactivation command for the SN based on a pre-defined condition in the MR-MC network, the pre-defined condition includes a data requirement, a type of service, a load condition, a signal condition associated with a UE in the MR-MC network system to reduce a signalling overhead and battery power consumption of the UE.

FIG. 1 illustrates a CP architecture for an MR-DC network system according to an embodiment of the disclosure.

Referring to FIG. 1, the CP architecture for the MR-DC i.e., CP architecture for DC between LTE and NR. Each radio node has its own RRC entity (E-UTRA version if the node is an eNB or NR version if the node is a gNB) which can generate RRC PDUs to be sent to a UE. RRC PDUs generated by an SN can be transported via an MN to the UE. The MN always sends an initial SN RRC configuration via signaling radio bearer (SRB), but subsequent reconfigurations may be transported via MN or SN. When transporting RRC PDU from the SN, the MN does not modify the UE configuration provided by the SN.

Figure 2:
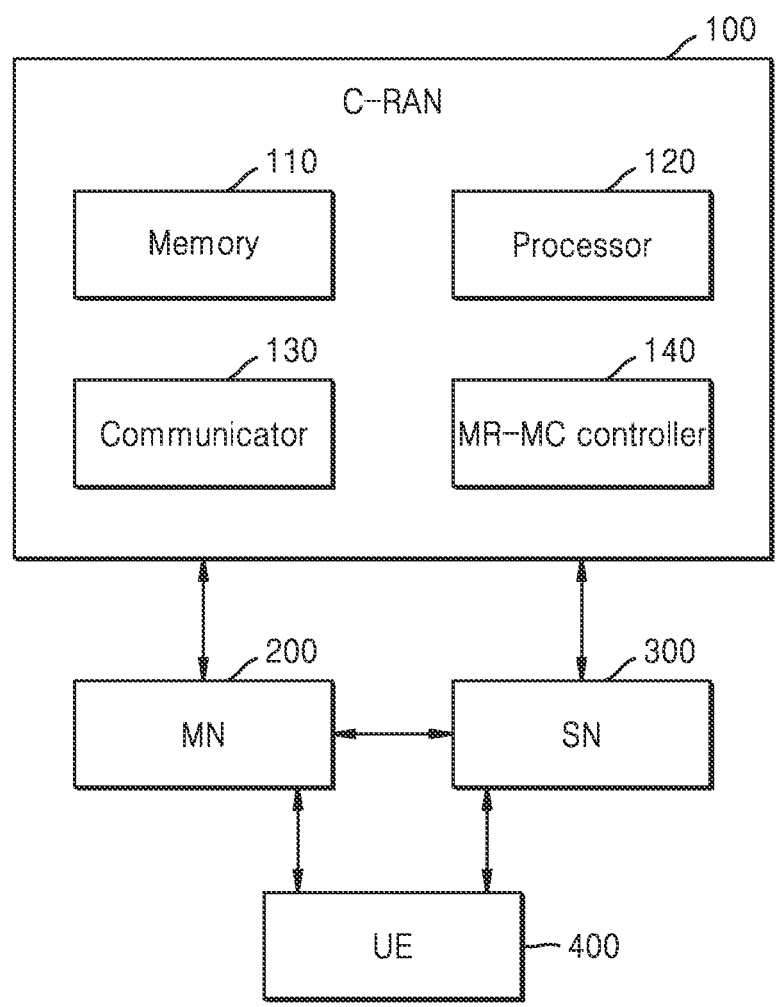
FIG. 2 illustrates a block diagram of an MR-MC network system, according to an embodiment of the disclosure.

FIG. 2 illustrates a block diagram of an MR-MC network system, according to an embodiment of the disclosure.

Figure 7:
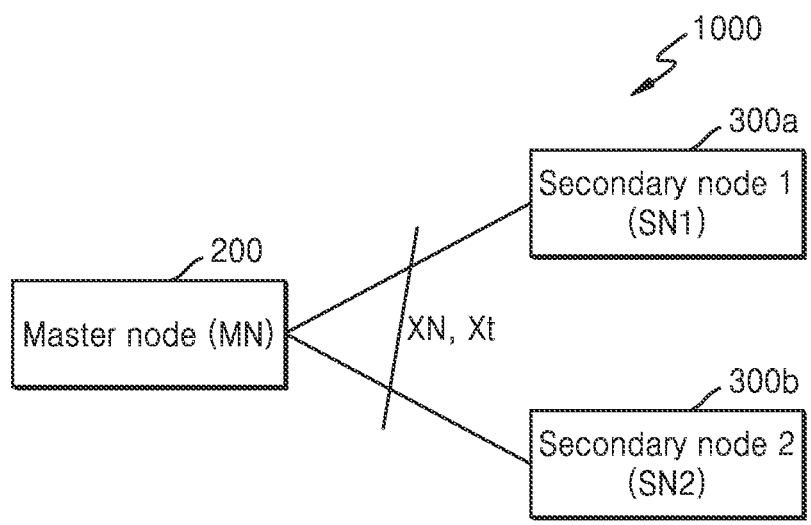
FIG. 7 illustrates a scenario of one MN is controlling two SNs in a MR-MC network system, according to an embodiment of the disclosure.

Referring to FIG. 2, the MR-MC network system may include a C-RAN 100 (Cloud/Controlling/central/Core network (CN) RAN) or Virtual RAN with GPU/without GPU, Open Radio Access Network (O-RAN) etc., a MN 200, a SN(s) 300 (e.g. a first secondary node (SN1) 300a of FIG. 7, a second secondary node (SN2) 300b of FIG. 7), and a UE 400. The C-RAN 100 may include a memory 110, a processor 120, a communicator 130, and an MR-MC controller 140.

The C-RAN 100 can be LTE eNB or EPC if the MN 200 is LTE, the C-RAN 100 can be NR gNB or NGC if the MN 200 is NR or (e) LTE. The C-RAN 100 can be e-LTE nodeB or NGC if the MN 200 is e-LTE. The C-RAN 100 can be 6G THz node or 6G NW if the MN 200 is 6G NW. The C-RAN 100 can be any of the RAT. The C-RAN 100 can also be an independent module which is taking decisions for all the three RATs. The C-RAN 100 will be aware of the UE 400 capability and measurements of the RATs and accordingly will take the decision to decide the role of each RAT.

In the MR-MC network system, the radio access node that provides the CP connection to the C-RAN 100 is the MN 200. The MN(s) 200 is connected to the Core-NW or C-RAN 100 via NG Control plane (NG-C) interface or Terahertz Control plane (THz-C) interface and to the SN(s) 300 via the Xn or Xt interface. In the MR-MC network system, the radio access node, with no CP connection to the C-RAN 100, providing additional resources to the UE 400 can be the SN(s) 300. The SN(s) 300 might also be connected to the 5GC via the Core-NW or C-RAN 100 via NG User plane (NG-U) interface or THz-U interface. In the MR-MC network system, need to define a new definition for the MN 200 and the SN(s) 300 as multiple RATs are involved in the architecture.

The memory 110 stores a capability of the UE 400, Radio Access Technology (RAT) measurements associated with the MN 200, the SN1 300a of FIG. 7, and the SN2 300b of FIG. 7, functionalities of the MN 200, the SN1 300a, the SN2 300b, and path of a UP and a CP associated with the UE 400 in the MR-MC network system. The memory 110 also stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). In an embodiment, the memory 110 can be an internal storage unit or it can be an external storage unit of the C-RAN 100, a cloud storage, or any other type of external storage.

The processor 120 communicates with the memory 110, the communicator 130, and the MR-MC controller 140. The processor 120 is configured to execute instructions stored in the memory 110 and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 is configured for communicating internally between internal hardware components (e.g., the memory 110, the processor 120, and the MR-MC controller 140) and with external devices (e.g., the MN 200, the SN(s) 300, and the UE 400) via one or more networks.

In an embodiment, the MR-MC controller 140 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the MR-MC controller 140 is configured to control a cellular band transceiver for communication with a Base station (BS) or Radio unit (RU) (i.e., the MN 200, and the SN 300) having a frequency less than 6 GHz which can be based on RAT-A technology which could be LTE or eLTE or NR system. Furthermore, the MR-MC controller 140 is configured to control the cellular band transceiver for communication with the BS or the RU having a frequency more than 6 GHz which can be based on RAT-B technology which could be eLTE or NR system or LF mmW system or HF mmW system. Furthermore, the MR-MC controller 140 is configured to control the cellular band transceiver for communication with a BS or RU having a frequency more than 52.6 GHz or 60 or 100 GHz which can be based on RAT-C technology which could be 6G THz or LF mmW system or HF mmW system or VLC.

Furthermore, the MR-MC controller 140 is configured to perform various role or function of the C-RAN 100 can be, dynamic switching between the multi-RAT applications, decide functionalities of the MN 200 and the SN(s) 300, decide functionalities of the primary MN 200 or secondary MN 300a, decide path of the CP and UP path with the device or the UE 400. Furthermore, the MR-MC controller 140 is configured to map services on specific RAT like say voice call can go on LTE or NR and higher data rates can go on NR or THz. The same could be the case for MTC and URLLC services. Furthermore, the MR-MC controller 140 is configured to interchange the MN 200 and SN 300 based on load, data rate, and services. Furthermore, the MR-MC controller 140 is configured to add, remove, and modify the SN(s) 300 the secondary MN 300a, and the MN 200. Furthermore, the MR-MC controller 140 is configured to aggregate user data can be done at the C-RAN 100 and bearer setup, mapping of bearers to different RATs, handling of errors of the MN 200 and SN 300, and transferring the information of one RAT to another can be taken up by the C-RAN 100 itself.

In addition, descriptions of defining the role/functionalities of the MN 200, the SN 300, the C-RAN 100, the CP and the UP in the MR-MC network system, and design solution to avoid signalling overhead and latency are explained with example in the FIGS. 3, 4, 5, 6A, 6B, 6C, 7, 8, 9A, 9B, 10, 11, 12, 13, and 14.

The MR-MC can be a homogeneous deployment where all of the cells provide similar coverage, e.g. macro or small cell only. It can be a heterogeneous deployment where cells of different sizes are overlapped, e.g. macro and small cells. There are three RATs which can be combination LTE and/or eLTE and/or 5G NR and/or WLAN and/or 6 g THz and/or HF mmW and/or LF mmW and/or VLC and/or Infrared waves and/or ultra-violet. As an example, consider the three RATs could be (e) LTE, NR, and 6G THz. The deployment can be of a scenario where (e) LTE, NR, and 6G THz cells are overlaid and co-located providing similar coverage. (e) LTE, NR, and 6G THz cells are macro or small cells. The scenario where (e) LTE, 6G THz, and NR cells are overlaid, and co-located or not co-located, providing different coverage. In this case, (e) LTE serves macrocells and NR, 6G THz serves small cells. A co-located cell refers to a small cell together with a macro cell for which their eNB/gNB/6G Node is installed at the same location. A non-co-located cell refers to a small cell together with a macro cell for which their eNB/gNB/6 g Node is installed at a different location. In addition, descriptions of deployment of the MR-MC network system 1000 are explained with example in the FIGS. 3 to 5.

The MR-MC network system 1000 defines role of the MN 200 and SN(s) 300. In the MR-MC network system 1000, three or more RATs will be connected to device or the UE 400. There are multiple options to define the MN 200 and the SN(s) 300 in the MR-MC network system 1000. All options mentioned below are applicable for various deployment options of the MR-MC network system 1000 as discussed above.

In the MR-MC network system 1000, the radio access node that provides the CP connection to the C-RAN 100 is the MN 200. The MN(s) 200 is connected to the Core-NW or C-RAN 100 via NG-C or THz-C interface and to the SN(s) 300 via the Xn or Xt interface. In the MR-MC network system 1000, the radio access node, with no CP connection to the C-RAN 100, providing additional resources to the UE 400 can be the SN(s) 300. The SN(s) 300 might also be connected to the 5GC via the Core-NW or C-RAN 100 via NG-U or THz-U interface. In the MR-MC network system 1000, need to define a new definition for the MN 200 and the SN(s) 300 as multiple RATs are involved in the architecture. In addition, descriptions of role of the MN 200 and SN(s) 300 are explained with example in the FIGS. 7, 8, 9A, and 9B.

The MR-MC network system 1000 defines a role of the C-RAN 100 (Cloud/Controlling/central/Core NW RAN)):

1. The C-RAN 100 act as a controller for controlling the cellular band transceiver for communication with a BS having frequency less than 6 GHz which can be based on RAT-A technology which could be LTE or eLTE or NR system.

2. The C-RAN 100 will act as a controller for controlling the Cellular band transceiver for communication with a BS having frequency more than 6 GHz which can be based on RAT-B technology which could be eLTE or NR system or LF mmW system or HF mmW system or VLC system.

3. The C-RAN 100 will act as a controller for controlling the Cellular band transceiver for communication with a BS having frequency more than 60 or 100 GHz which can be based on RAT-C technology which could be 6G THz or LF mmW system or HF mmW system or infrared waves.

100 The C-RAN 100 can be LTE eNB or EPC if the MN 200 is LTE, the C-RAN 100 can be NR gNB or NGC if the MN 200 is NR or (e) LTE. The C-RAN 100 can be e-LTE nodeB or NGC if the MN 200 is e-LTE. The C-RAN 100 can be 6G THz node or 6G NW if the MN 200 is 6G NW. The C-RAN 100 can be any of the RAT. The C-RAN 100 can also be an independent module which is taking decisions for all the three RATs. The C-RAN 100 will be aware of the UE 400 capability and measurements of the RATs and accordingly will take the decision to decide the role of each RAT. The various roles or function of the C-RAN 100 can play is listed below:

1011. The C-RAN 100 could be used for dynamic switching between the multi-RAT Access points.

2. The C-RAN 100 will decide the MN 200 and the SN(s) 300.

3. The C-RAN 100 will decide the primary MN 200 and secondary MN 300a.

4. The C-RAN 100 will decide the SN1 300a or the SN2 300b.

5. The C-RAN 100 will decide the path of the CP and UP path with the device or the UE 400.

6. The C-RAN 100 can map the services on specific RAT like say voice call can go on LTE or NR and higher data rates can go on NR or THz. The same could be the case for MTC and URLLC services.

7. The C-RAN 100 can interchange the MN 200 and SN 300 based on load, data rate, and services.

8. The C-RAN 100 can add, remove, and modify the SN(s) 300 the secondary MN 300a, and the MN 200.

9. The aggregation of user data can be done at the C-RAN and bearer setup, mapping of bearers to different RATs, handling of errors of the MN 200 and SN 300, and transferring the information of one RAT to another can be taken up by the C-RAN itself.

The MR-MC network system 1000 defines path of the CP and the UP. Where CP options for RRC at the MR-MC network system 1000: As mentioned in 3GPP spec 38.804. When DC between the LTE and the NR is configured for the UE, the UE has a single RRC state machine based on the MN 200's RAT. In this operation, single CP connection is established towards CN. Each node has its own RRC entity which can generate RRC PDUs and inter-node PDUs using ASN.1. RRC PDUs and inter-node PDUs generated by the SN are embedded with RRC PDUs generated by the MN 200 which are transported via the MN 200 to the UE 400 for the first configuration, and for the SN RRC reconfiguration requiring the MN 200's RRC reconfiguration and vice versa. The MN 200 needs not to modify or add the UE configurations for the SN 300. The UE 400 can be configured to establish an SRB in the SN 300 to enable RRC PDUs for the SN 300 to be sent directly between the UE 400 and the SN 300. RRC PDUs for the SN 300 can be transported directly to the UE 400 for the SN 300's RRC reconfiguration not requiring any coordination with the MN 200.

Alternatively, it can be delivered embedded within RRC PDUs generated by the master node, which is up to the network implementation. In the case of the MR-MC network system 1000, may have 3 or more RAT, so there is a need to design the CP architecture for the MR-MC network system 1000 between different RATs as an example say (e) LTE, THz or and NR. The method mentioned here will be applicable for other cases i.e. for all the combinations of RATs or the same set of RAT in the MR-MC network system 1000. In addition, descriptions of defines path of the CP and the UP are explained with example in the FIGS. 10 to 13.

The MR-MC network system 1000 provides a solution to avoid signalling overhead & latency, and a solution to reduce battery consumption of the UE 400. The detail descriptions are provided in the FIG. 14.

Although the FIG. 2 shows various hardware components of the MR-MC network system 1000 but it is to be understood that other embodiments are not limited thereon. In other embodiments, the MR-MC network system 1000 may include less or more number of components. Further, the labels or names of the components are used only for illustrative purpose and does not limit the scope of the disclosure. One or more components can be combined together to perform same or substantially similar function to establish the MR-MC network system 1000.

Figure 3:
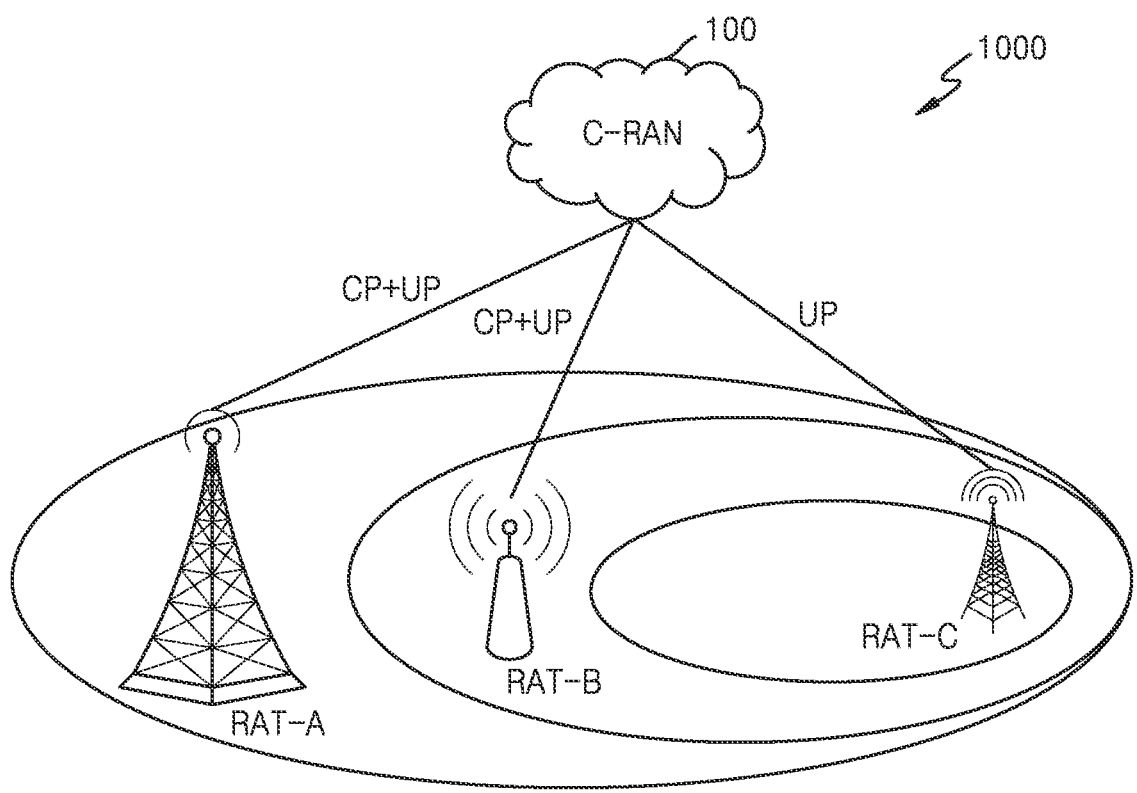
FIG. 3 illustrates a deployment of the MR-MC network system having two CP connections with a C-RAN and overlaid cells, according to an embodiment of the disclosure.

FIG. 3 illustrates a deployment of a MR-MC network system having two CP connections with a C-RAN and overlaid cells, according to an embodiment of the disclosure.

Referring to FIG. 3, consider a scenario of the related art, one of the possible deployment options for the MR-MC network system 1000. In this case for both RAT-A and RAT-B there exists a CP connection with the C-RAN 100. The UP data is routed to RAN directly through the C-RAN 100. Alternatively, UP data flow in the same bearer is split at the C-RAN 100. All three RATs will be used for UP data.

There can be a CP connection between the RAT-A and the RAT-B and/or RAT-A and RAT-C and/or RAT-B and RAT-C. There can be a UP connection between RAT-A and RAT-B and/or RAT-A and RAT-C and/or RAT-B and RAT-C.

1) The C-RAN 100 (e.g. Cloud/Controlling/central RAN/Core RAN) will act as a controller for controlling the cellular band transceiver for communication with a Base station (BS) or Radio unit (RU) having a frequency less than 6 GHz which can be based on RAT-A technology which could be LTE or eLTE or NR system.

2) The C-RAN 100 will act as a controller for controlling the cellular band transceiver for communication with a BS having a frequency more than 6 GHz which can be based on RAT-B technology which could be eLTE or NR system or LF mmW or HF mmW system.

3) The C-RAN 100 will act as a controller for controlling the Cellular band transceiver for communication with a BS or RU having a frequency more than 52.6 GHz or 60 or 100 GHz which can be based on RAT-C technology which could be 6G THz or LF mmW system or HF mmW system or VLC.

As an example RAT-A can be (e) LTE or NR, RAT-B can be NR high mmW and RAT-C can be THz. The C-RAN 100 can be a core network which can be Next-generation core (NGC) or Evolved Packet Core (EPC) or gNB or eNB or 6G nodeB or a Cloud RAN can be a combination of multiple RAT or Core NW technologies which is capable of handling multiple radios which is of different or same frequency bands and their functions related to UP data and CP. In this case (e) LTE serves macrocells and NR, 6G THz serves small cells. In case (e) LTE acts as the MN 200 and it is connected to NextGen Core. Data transport through NR gNB connected to NextGen Core via NextGen Core. Data transport through 6G NodeB connected to NextGen Core via NextGen Core. There will be a CP connection for (e) LTE as well as NR. Both these can be connected to NGC. The C-RAN can first set the MN 200 connection and then set the secondary RAT (e.g. SN1, SN2) connections. A mobile station (MS)/UE or device can receive the data from all the three RATs i.e. (e) LTE, NR, and THz technology. Different RATs can carry different data from a different application or the same application.

Figure 4:
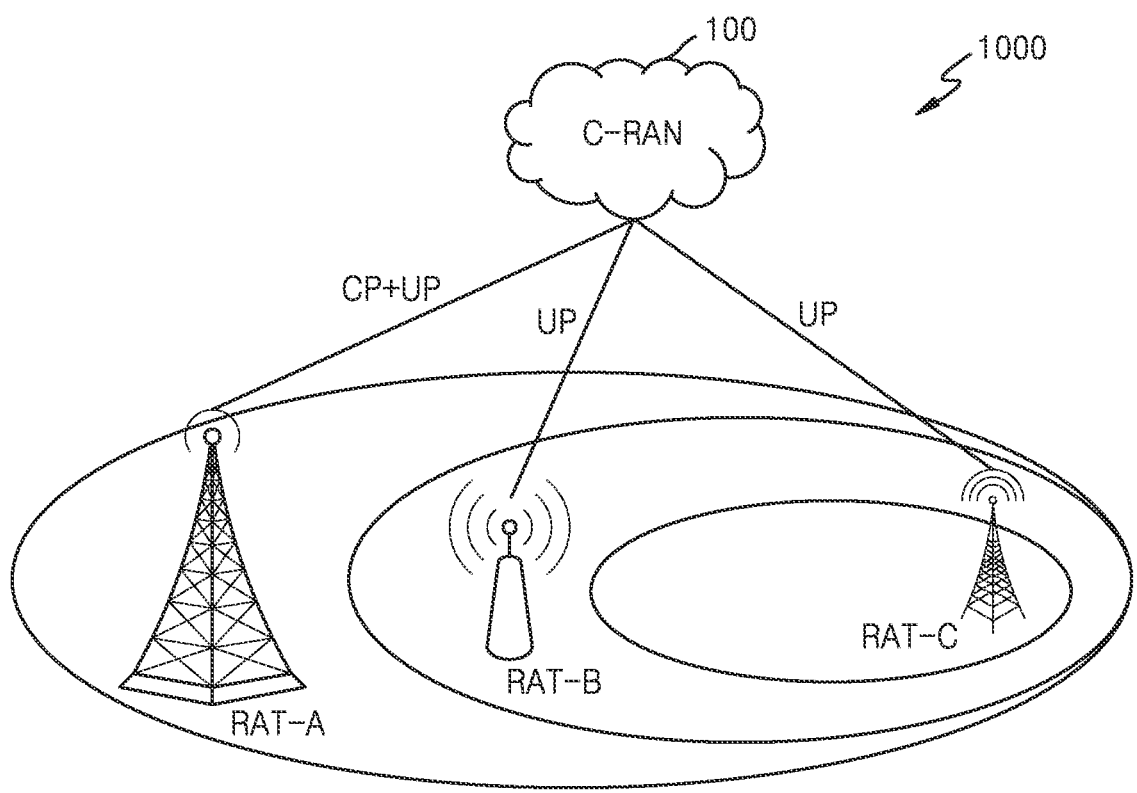
FIG. 4 illustrates a deployment of a MR-MC network system having one CP connection with a C-RAN and overlaid cells, according to an embodiment of the disclosure.

FIG. 4 illustrates a deployment of a MR-MC network system having one CP connection with a C-RAN and the overlaid cells, according to an embodiment of the disclosure.

Referring to FIG. 4, consider a scenario of the related art, the scenario where (e) LTE, 6G THz, and NR cells are overlaid, and co-located or not co-located, providing different coverage. In this case (e) LTE serves macrocells and NR, 6G THz serves small cells. Referring to FIG. 4, there exists one CP connection between the C-RAN 100 and RAN for RAT-A. The UP data is routed to RAN directly through the C-RAN 100. Alternatively, UP data flow in the same bearer is split at RAN. All three RATs will be used for UP data.

There can be a CP connection between RAT-A and RAT-B and/or RAT-A and RAT-C and/or RAT-B and RAT-C. There can be a UP connection between RAT-A and RAT-B and/or RAT-A and RAT-C and/or RAT-B and RAT-C.

Figure 5:
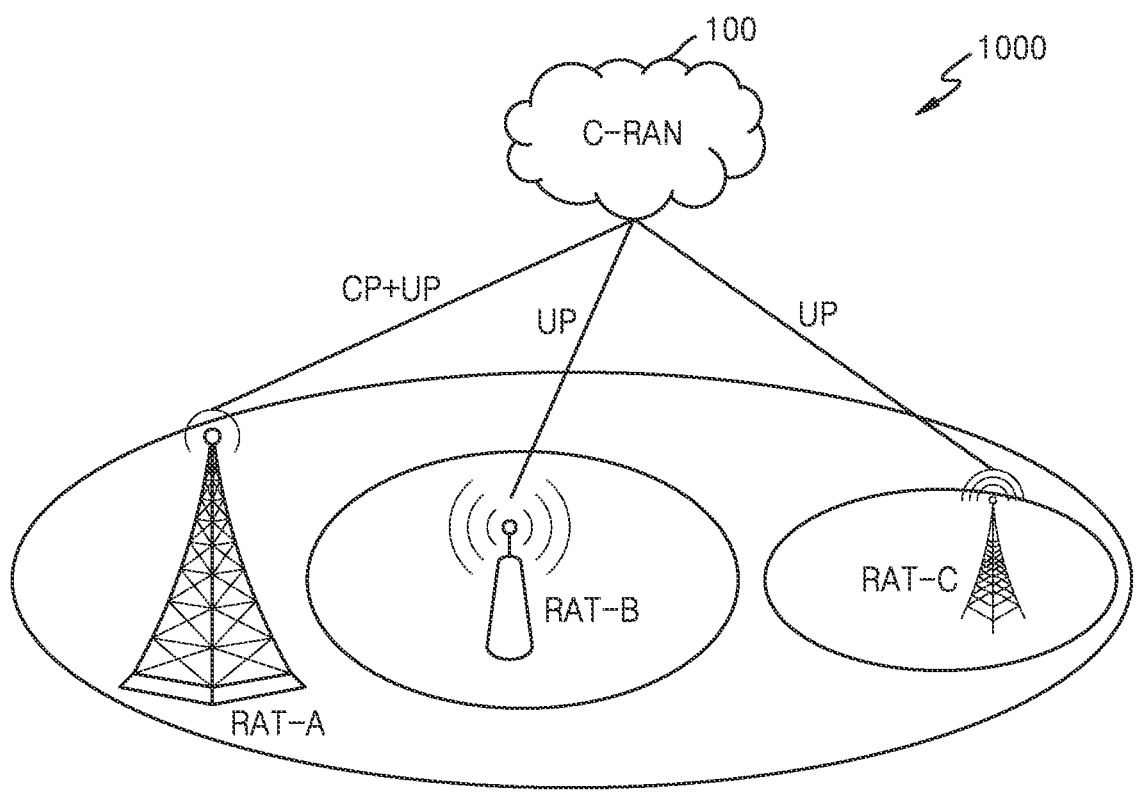
FIG. 5 illustrates a deployment of a MR-MC network system having one CP connection with a C-RAN and overlaid cells with different coverage area, according to an embodiment of the disclosure.

FIG. 5 illustrates deployment of a MR-MC network system having one CP connection with a C-RAN and overlaid cells with different coverage areas, according to an embodiment of the disclosure.

Referring to FIG. 5, consider a scenario of the related art, the scenario where (e) LTE, 6G THz, and NR cells are overlaid, and co-located or not co-located, providing different coverage area. In this case (e) LTE serves macrocells and NR, 6G THz serves small cells. In this case, RAT-B and RAT-C are providing different coverage in the geographical area. Referring to FIG. 5 there exists one CP connection between the C-RAN 100 and RAN for RAT-A. The UP data is routed to RAN directly through the C-RAN 100. Alternatively, the UP data flow in the same bearer is split at RAN. All three RATs will be used for UP data.

There can be a CP connection between RAT-A and RAT-B and/or RAT-A and RAT-C and/or RAT-B and RAT-C. There can be a UP connection between RAT-A and RAT-B and/or RAT-A and RAT-C and/or RAT-B and RAT-C. There is a possibility in this case only one RAT is active among RAT-B and RAT-C based on device location. In this type of the MR-MC network system 1000 deployments as only one RAT is active at a time then the MS will be getting data from two RATs only. In case the device is at border of RAT-B and RAT-C then it can get data from all the three RATs at the same time.

Figure 6B:
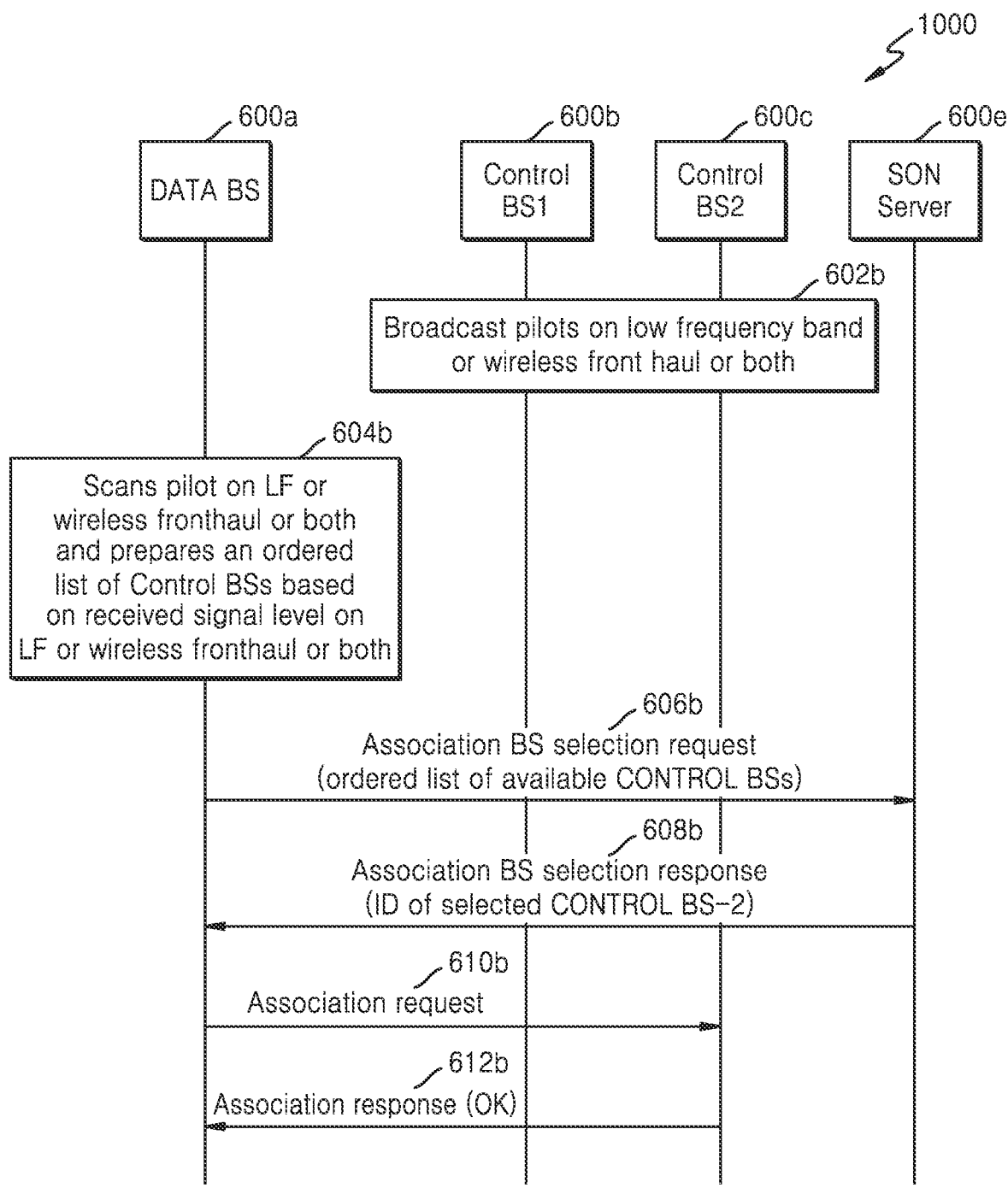
Figure 6C:
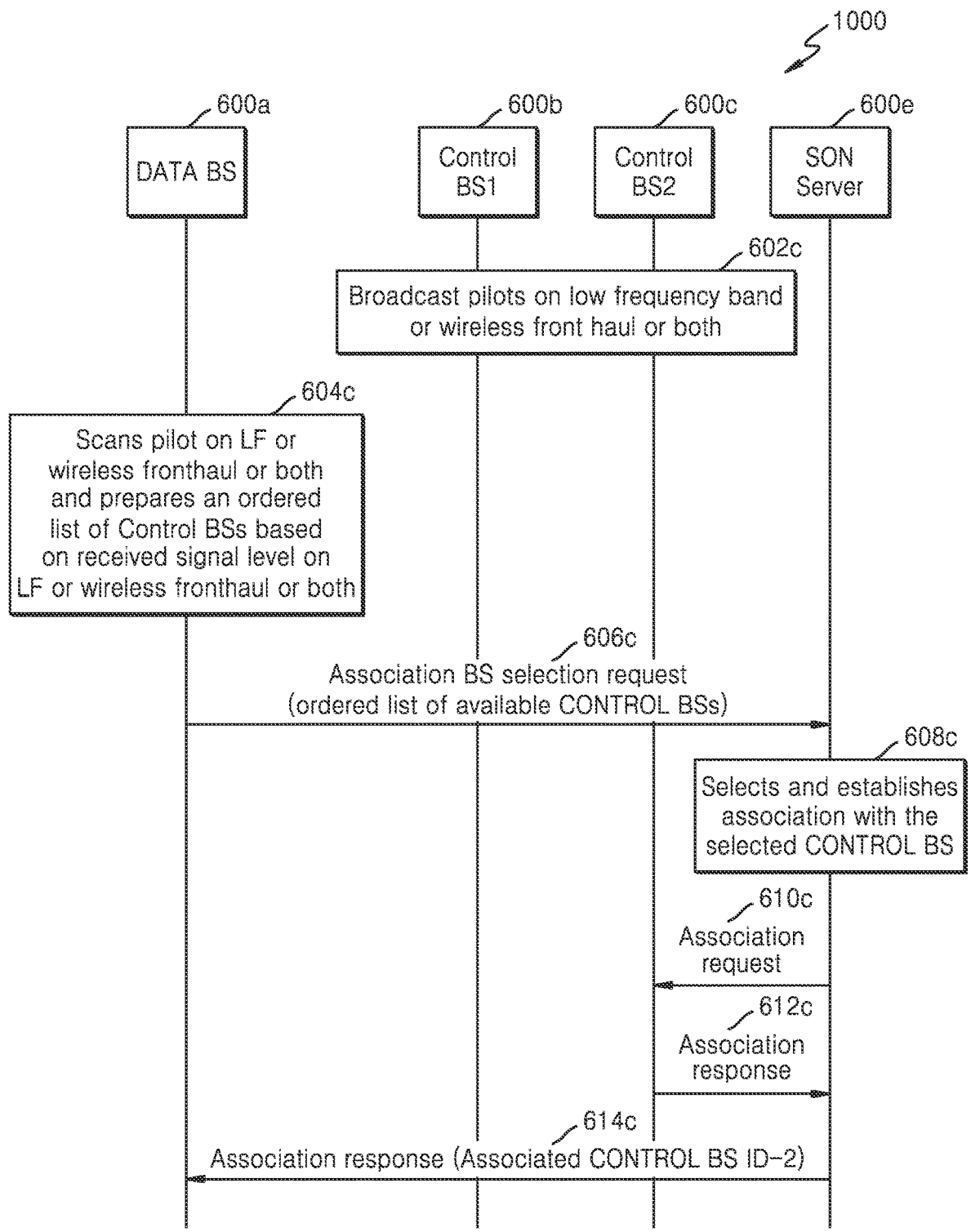

FIGS. 6A to 6C are sequence diagrams illustrating various operations for an association between a Data BS and Control BS(s), according to embodiments of the disclosure.

Referring to FIGS. 6A to 6C, consider a scenario of the related art, the scenario where (e) LTE, 6G THz, and NR cells are overlaid, and co-located or not co-located, providing different coverage or similar coverage in the MR-MC network system 1000. All these radios can belong to different frequency bands. The information that requires higher reliability can be transmitted on the lower frequency band and the remaining information (such as upper layer data) can be transmitted on the higher frequency band. This is also applicable for the case where we have a dual connectivity mode of operation between the 5G mmW system and 6G THz system or high-frequency mmW system. Information that requires higher reliability can include control signaling such as resource allocation information, UL and DL HARQ acknowledgment, channel state feedback, broadcast information, power control, synchronization information, bandwidth request, buffer status report, another L1 control signaling, etc. Such information can be related to transmission of data in a higher band or can be related to information transmitted in the lower band itself.

However, if DL synchronization signals, UL sounding signals, ranging signals for high-frequency band are required then these need to be communicated on the high-frequency carrier itself as these are dependent on the carrier frequency. Similarly, if the DL synchronization signals, UL sounding signals, and ranging signals for low frequency are required then these need to be communicated on the low-frequency carrier.

Such an asymmetric multiband multicarrier system is particularly useful when the lower frequency band is the cellular band or low-frequency millimeter-wave band and the higher frequency band is of considerably higher frequency range than the typical cellular band such as the high millimeter-wave band or THz waveband. Cellular band or low-frequency millimeter-wave band is much more reliable than the high-frequency millimeter-wave band or THz waveband and hence the control signaling required higher reliability than the data can be transmitted using the cellular band while the data is transmitted using the high-frequency millimeter-wave band or THz waveband.

The lower band transmission point is further referred to as the Low-Frequency Control BS 600b, 600c, and 600d. The higher band transmission point (s) is further referred to as the High-Frequency Data BS 600a. There will be more than one Data BS 600a in the case of the MR-MC network system 1000. The mobility aspects are anchored at the Control BS 600b, 600c, and 600d thereby reducing the need for frequent handovers between the Data BSs 600a. The idle mode is dependent on the Control BSs 600b, 600c, and 600d only and is independent of the Data BSs 600a. The idle mode can be performed in a manner that is similar to the typical 4G/5G systems. In another embodiment of the disclosure, the L2 Control Signaling is also communicated via the Control BS 600b, 600c, and 600d on the low-frequency band. One Control BS 600b, 600c, and 600d may be associated with multiple Data BSs 600a. The Control BS 600b, 600c, and 600d will be the MN 200 and Data BS 600a will be the SN (s) 300.

Information requiring high reliability corresponding to a Data BS 600a is transmitted from an associated Control BS 600b, 600c, and 600d. One Control BS 600b, 600c, and 600d may be associated with multiple Data BSs 600a. Typically, the Data BSs 600a that lie in the coverage of the Control BS 600b, 600c, and 600d is associated with that Control BS 600b, 600c, and 600d.

In one embodiment of the disclosure, prior operations for the FIGS. 6A to 6C: the Data BSs 600a scan for the available Control BSs 600b, 600c, and 600d. If more than one Control BS 600b, 600c, and 600d is available (for example at the coverage periphery of the Control BS), the Data BS 600a can choose the Control BS 600b, 600c, and 600d to associate with. This can be done for example based on the received signal level of the pilots on the low-frequency band that is used by the Control BS 600b, 600c, and 600d for transmission to the MS, at the Data BS 600a. Alternatively, this can be done for example based on the received signal level of the pilots on the front haul Control BS 600b, 600c, and 600d to Data BS 600a wireless link) link. Alternatively, this can be done based on the combination of the received signal level on the front haul and the received signal level of the low-frequency band that is used by the Control BS 600b, 600c, and 600d for transmission to the MS.

Referring to FIG. 6A: at operations 602a-604a, the Data BS(s) 600a performs the prior operations as discussed earlier. Only the Control BSs 600b and 600c which meet the threshold requirements for both the received signal levels are selected as the available Control BSs 600b and 600c. At operations 606a-610a, the Data BS 600a needs to send a request to the Control BS 600b and 600c indicating its intention of association with the Control BS 600b and 600c. This message can be used to establish a data BS context at the Control BS 600b and 600c to provide resources from the Control BSs 600b and 600c to the Data BSs 600a. The Data BS 600a decides to request the Control BSs 600b and 600c to allocate resources for the Data BSs 600a indicates the requested configuration information. It can also include the entire UE capabilities if it is associated with any UE 400. In this case, the Data BS 600a also provides the latest measurement results for Control BSs 600b and 600c to choose and configure the SCG cell(s). The Control BS 600b and 600c sends a response indicating whether it accepts the association or not. If Radio resource management (RRM) entity in the Control BS 600b and 600c is able to admit the resource request, it allocates respective radio resources and dependent on the bearer option, respective transport network resources. In case it did not accept it should send the response with reject message. If the Data BS 600a received association reject message from the Control BS1 600b then it should try with another Control BS2 600c. Once the Data BS 600a receives association response as OK then the Data BS 600a triggers random access so that synchronization of the Data BS 600a radio resource configuration can be performed with selected the Control BS (i.e., 600c).

Referring to FIG. 6B: at operations 602b-604b, the Data BS(s) 600a performs the prior operations as discussed earlier, in case if the Control BS 600d does not accept the association request, the Data BS 600a can try associating similarly to next in order of received signal level available Control BS 600b and 600c. At operations 606b-612b, the Data BS 600a sends the list of available Control BSs 600b and 600c to a Self-organizing network (SON) server 600e in the MR-MC network system 1000 which in turn responds with an ID of the Control BS 600b and 600c with which the Data BS 600a has to associate. It can also provide the configuration so that the Data BS 600a can check whether it is compatible with provided list of the Control BS 600b and 600c or not. The Data BS 600a based on configuration and information shared by the SON server 600e should try association with the Control BS 600c as mentioned in this disclosure.

Referring to FIG. 6C: at operations 602c-604c, the Data BS(s) 600a performs the prior operations as discussed earlier. The Data BS 600a then sends a request to the Control BS 600b, 600c, and 600d indicating its intention of association with the Control BS 600b, 600c, and 600d. The Control BS 600b, 600c, and 600d sends a response indicating whether it accepts the association or not. At operations 606c-614c, in case if Control BS 600d does not accept the association request, the Data BS 600a sends the information that Control BS 600d has not accepted the association request to the SON server 600e which in turn sends another Control BS ID with which the Data BS 600a has to try to associate. The Data BS requests the SON server 600e to associate it with a suitable Control BS 600b and 600c. The Data BS 600a may provide information like a list of Control BSs 600b and 600c that it has scanned or its location information (for example GPS coordinates). The SON server 600e based on the received information establishes an association of the Data BS 600a with the Control BS 600b and 600c and communicates the decision of the selected and associated Control BS 600b and 600c to the Data BS 600a along with the relevant front haul specific information.

The method mentioned here is also applicable for the scenarios where we have multiple Data BS 600a belongs to different or the same frequency bands. The wireless front haul link between the Control BS 600b, 600c, and 600d and the Data BS 600a can be implemented using a high mmWave technology or THz technology similar to the one used between the Data BS 600a and the MS. Alternatively, it can be implemented using the lower frequency band technology like the existing 4G/5G technology or similar to the one used between the Control BS and the MS. The methods mentioned above are also applicable for dual connectivity mode of operation between 5G and 6G THz systems.

FIG. 7 illustrates a scenario of one MN is controlling two SNs in a MR-MC network system, according to an embodiment of the disclosure.

Referring to FIG. 7, consider a scenario of the related art, one RAT will act as the MN 200 which will have a control connection with the C-RAN 100. One RAT will act as the MN 200 and the other two RATs will act as the SN (s) the SN1 300a and the SN2 300b. The MN 200 should be capable of interchange between the SN1 300a and the SN2 300b depending upon the load, channel condition, type of service, data rate, etc. The MN 200 will be controlling both the SN1 300a and the SN2 300b.

The MN 200 will be connected to the SN1 300a and the SN2 300b through Xn or Xt or Xx interface. All control and data related information between two RATs will be transferred through these interfaces. The following procedures are the baseline for the MR-MC network system 1000 between (e) LTE, NR, 6G THz as an example:

1. The SN1 300a and the SN2 300b addition procedure triggered by the MN 200.
2. The SN1 300a and the SN2 300b release procedure triggered by both the MN 200 and the SN1 300a and the SN2 300b respectively;
3. Intra-secondary Node mobility triggered by SN1 300a and the SN2 300b;
4. Addition/Release of SCell within the SN1 300a and the SN2 300b triggered by the SN1 300a and the SN2 300b;
5. The SN1 300a and the SN2 300b change procedure triggered by the SN1 300a and the SN2 300b.

Intra-secondary node mobility should be managed by the SN 300 itself. PSCell change and SCell addition/release are regarded as part of the intra-secondary node mobility. At least in some cases, the MN 200 needs to be informed of the occurrence of the intra-secondary node mobility. The MN 200 is involved and takes the final decision before the SN 300 change occurs in some cases. Here, SN 300 can SN1 300a or the SN2 300b. The SN 1/2 300a/300b will not be involved in the decision and operations for other SN i.e. SN 2/1 300b/300a.

The SN2 300b Addition procedure is initiated by the MN 200 and is used to establish a UE 400's context at the SN2 300b to provide resources from the SN2 300b to the UE 400. The SN2 300b modification procedure may be initiated either by the MN 200 or by the SN2 300b and be used to modify, establish or release bearer contexts, to transfer bearer contexts to and from the SN2 300b or to modify other properties of the UE 400's context within the same SN2 300b. It may also be used to transfer an NR RRC message from the SN2 300b to the UE 400 via the MN 200 and the response from the UE 400 via the MN 200 to the SN2 300b. The SN2 300b modification procedure does not necessarily need to involve signaling towards the UE 400, e.g. in case of the RRC connection re-establishment due to Radio Link Failure in the MN 200.

The SN2 300b Change procedure is initiated either by the MN 200 or the SN2 300b and used to transfer the UE 400's context from a source SN2 300b to a target SN2 300b and to change the SCG configuration in the UE 400 from one SN2 300b to another. All the procedures mentioned above for SN2 can be performed by SN1 also in case there is an interface between SN2 300b and SN1 300a. It may or may not involve the MN 200.

Figure 8:
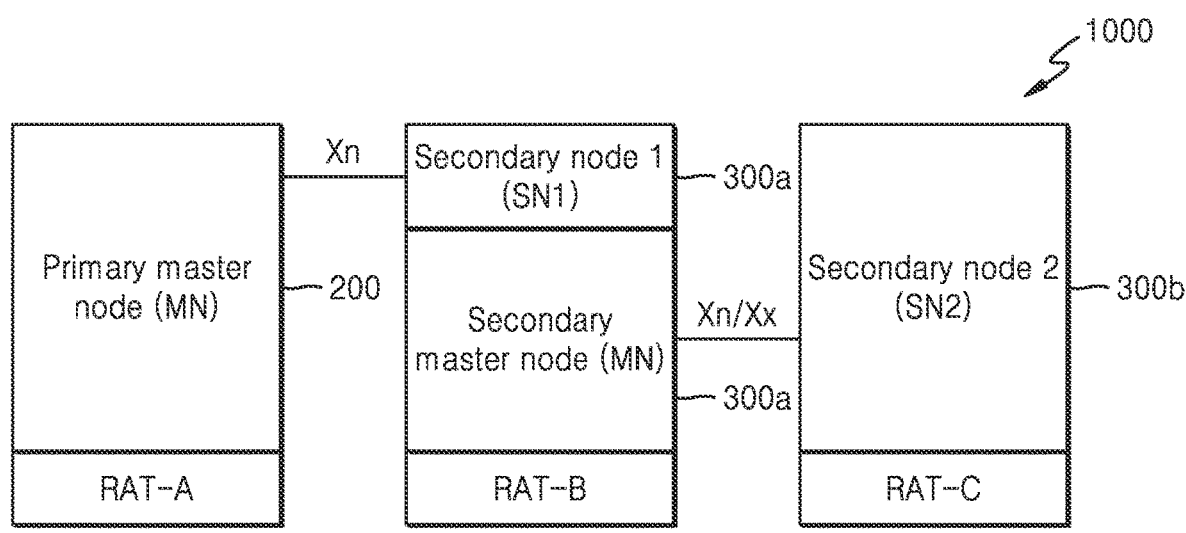
FIG. 8 illustrates a scenario of two MN and two SNs (Linked List Mechanism) in a MR-MC network system, according to an embodiment of the disclosure.

FIG. 8 illustrates a scenario of two MNs and two SNs (Linked List Mechanism) in a MR-MC network system, according to an embodiment of the disclosure.

Referring to FIG. 8, consider a scenario of the related art, the MR-MC network system 1000 consists of two MN 200 and 300a one is primary MN 200 and the other is secondary MN 300a. RAT-A is acting as the primary MN 200, RAT-B is acting as the SN1 300a (i.e., secondary MN). RAT-C is acting as the SN2 300b. It will also act as secondary MN 300a or Master Node for the SN2 300b. All these nodes are interconnected with each other through Xn and Xt/Sn interface. There is no direct communication between Primary MN 200 and the SN2 300b. All nodes are connected to each other in the Linked list mechanism. One RAT will act as Primary MN 200 and the other RAT will act as the SN1 300a. This Primary MN 200's RAT will be responsible for addition, release, modification, allocation of resources, failure handling for the SN1 300a.

The SN1 300a will also act as secondary MN for another RAT which is the secondary node say the SN2 300b. The secondary MN 300a's RAT will be responsible for addition, release, modification, allocation of resources, failure handling the SN2(s) 300b. The primary MN 200 is responsible for transferring the control messages for the SN1 300a. The secondary MN 300a is responsible for transferring the control messages for the SN2 300b. The secondary MN 300a or primary MN 200 can also transfer control messages related to the SN2 300b to the UE 400 or device. The secondary MN 300b may or may not coordinate with the primary MN 200 for decision-related to the SN2 300b. The decision of adding/modification/release the SN2 300b can be taken up by the secondary MN 300b but it needs to inform the primary MN 200 about the same. In other solutions, it is not mandatory for secondary MN 300a to inform the addition/modification/release to the primary MN 200. The decision of adding the SN2 300b is based on the UE 400's capability.

Figure 9A:
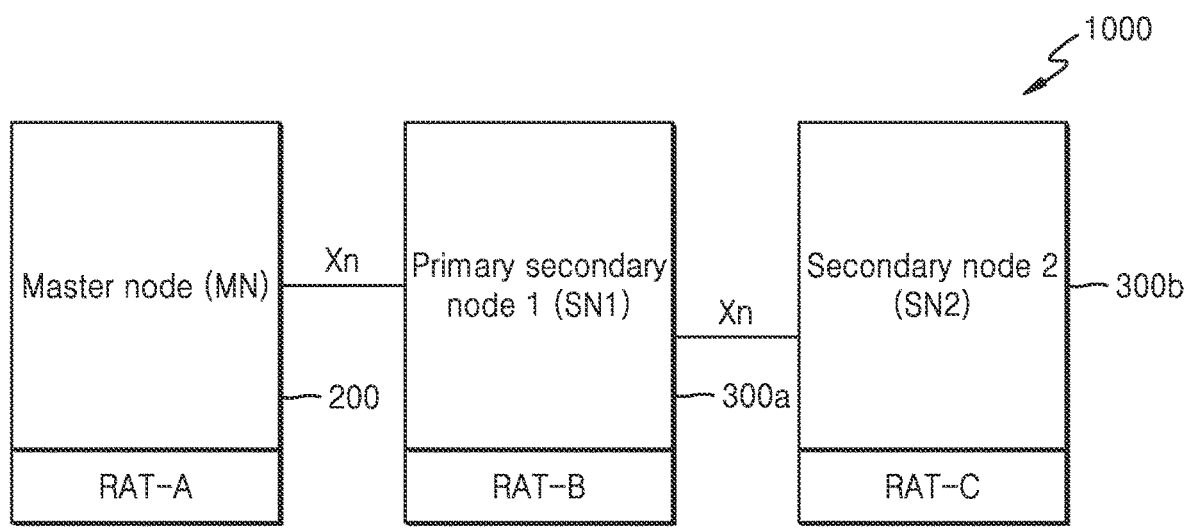
FIGS. 9A and 9B illustrate a scenario of one MN, a first secondary node (SN1), and a second secondary node (SN2) in the MR-MC network system, according to various embodiments of the disclosure.
Figure 9B:
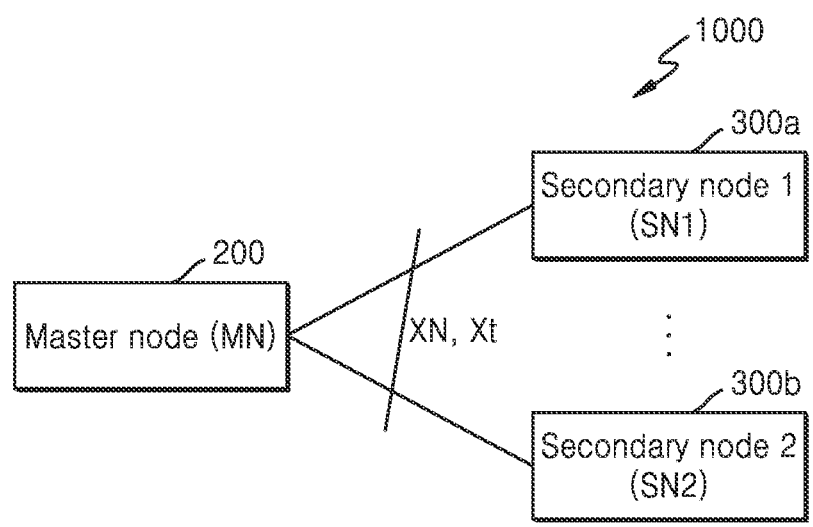

FIGS. 9A and 9B illustrates a scenario of one MN, a SN1, and a SN2 in a MR-MC network system, according to various embodiments of the disclosure.

Referring to FIGS. 9A and 9B, consider a scenario of the related art, there can be two variations of this option as shown. In this case, there will be one MN 200 and the other two are SN1 300a and SN2 300b. Consider FIG. 9A, in one case the SN2 300b is not directly connected to the MN 200 while in FIG. 9B, the SN2 300b is directly connected to the MN 200 and may or may not with the SN 300 as shown with dotted lines. The decision of adding/modification/release the SN2 300b can be taken up by the MN 200 or the SN1 300a. The SN2 300b can only be used to send the data, control messages like RRC messages, measurements, etc. can be always sent through the SN1 300a or the MN 200. All the procedures mentioned above will apply to the FIGS. 9A and 9B also. All the options related to the MN 200 and the SN 300 is applicable for all the possible the MR-MC network system 1000's architecture. It is possible that the SN2 300b can only be used to send or receive data and setup/release of this node is controlled through the MN 200 or the SN 300 only. All control related information like ACK, NACK related to data and signaling message can come through the SN1 300a.

Figure 10:
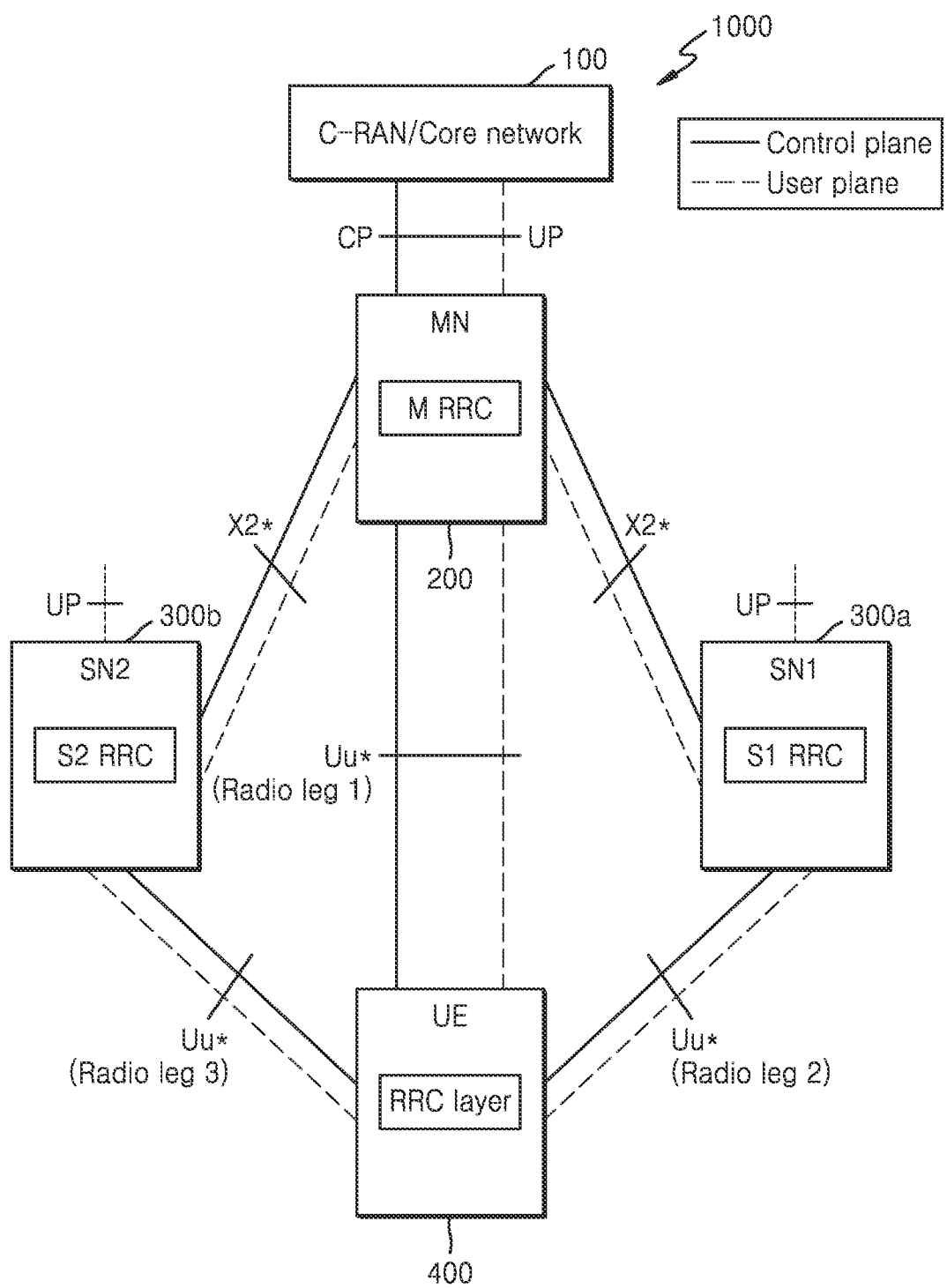
FIG. 10 illustrates a UE and a single CP connection to the C-RAN in a MR-MC network system, according to an embodiment of the disclosure.

FIG. 10 illustrates a UE 400 and a single CP connection to a C-RAN 100 in a MR-MC network system, according to an embodiment of the disclosure.

Referring to FIG. 10, consider a scenario of the related art, where the MR-MC network system 1000 between three or more RATs, say (e) LTE, 6G THz, and NR is configured for the UE 400, the UE 400 has a single RRC state machine based on the MN 200's RAT. In this operation, a single CP connection is established towards the C-RAN 100. With these principles, FIG. 10 illustrates the CP architectures for the MR-MC network system 1000 between the MN 200 and the primary MN 200, the SN1 300a, and the SN2 300b. Each node has its own RRC entity which can generate RRC PDUs and inter-node PDUs using ASN.1. RRC PDUs and inter-node PDUs generated by the SN1 300a and SN2 300b are embedded with RRC PDUs generated by the MN 200 which are transported via the MN 200 to the UE 400 for the first configuration, and for the SN1 300a and SN2 300b's RRC reconfiguration requiring the MN 200's RRC reconfiguration and vice versa. The MN 200 needs not to modify or add the UE 400 configurations for the SN1 300a and SN2 300b.

The UE 400 can be configured to establish an SRB in the SN1 300a and the SN2 300b to enable RRC PDUs for the SN 300 to be sent directly between the UE 400 and the SN1 300a and the SN2 300b. RRC PDUs for the SN1 300a and the SN2 300b can be transported directly to the UE 400 for the SN1 300a and the SN2 300b's RRC reconfiguration not requiring any coordination with the MN 200. Alternatively, it can be delivered embedded within RRC PDUs generated by the MN 200, which is up to the network implementation. Measurement reporting for mobility within the SN1 300a and the SN2 300b can be done directly from the UE 400 to the SN1 300a and the SN2 300b if the SN 300's SRB is configured.

There is also a solution where the SN2 300b does not have any RRC state machine and it will be only used to send the data. The configuration of secondary node will be done by the MN 200 and any modification needed for the SN 300 will be taken care by it's MN 200. The SN 300 may not be able to send any control message to the device or UE 400. It will form the message and send it to the MN 200 or the SN1 300a and then these nodes will transfer the message to the device. These messages are embedded with RRC PDUs generated by the MN 200 which are transported via the MN 200 to the UE 400.

Figure 11:
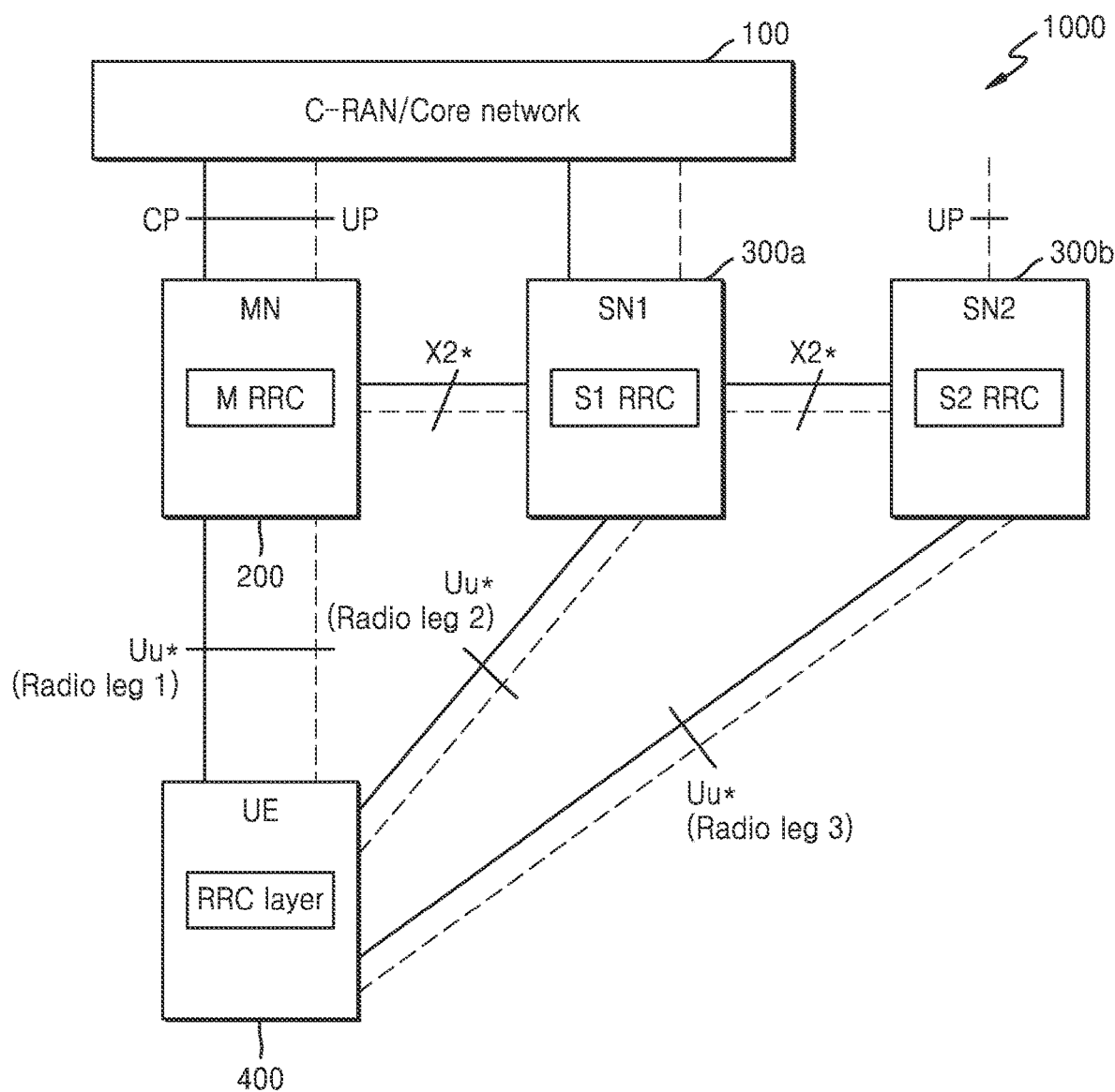
FIG. 11 illustrates a UE and two CP connections to a C-RAN in a MR-MC network system, according to an embodiment of the disclosure.

FIG. 11 illustrates a UE and two CP connections to a C-RAN in a MR-MC network system, according to an embodiment of the disclosure.

Referring to FIG. 11, consider a scenario of the related art, during the MR-MC network system 1000 between three or more RATs say (e) LTE, 6G THz and NR is configured for the UE 400, the UE 400 has two RRC state machines based on the MN 200 or primary MN 200's RAT and secondary MN 300a or SN1 300a's RAT. In this operation, two C-plane connection is established towards CN or the C-RAN 100. In this case primary MN 200's RAT and secondary MN 300a's RAT can be directly configured or controlled by the C-RAN 100 or Core NW. One example could be e-LTE and NR connected to NGC. In this case when the SN1 300a is added it can be done through the MN 200 and later it will make a connection with CN for the CP. When the SN2 300b is added all the setup related to this will be done directly by the SN1 300a and CN itself rather than from the MN 200. As it may cause additional delay for configuration/modification/release of the SN2 300b configuration. Additionally, all the SN2 300b configuration can also be done through the MN 200 via the SN1 300a.

The SN1 300a can take decision-related to the SN2 300b and informs the MN 200 if needed. Each node has its own RRC entity which can generate RRC PDUs and inter-node PDUs using ASN.1. RRC PDUs and inter-node PDUs generated by the SN2 300b are embedded with RRC PDUs generated by the MN 200 or SN1 300a which are transported via the MN 200 or SN1 300a to the UE 400 for the first configuration, and for the SN2 300b's RRC reconfiguration requiring the MN 200 or SN1 300a's RRC reconfiguration and vice versa.

The network has three CP say RRC entities that can generate ASN.1 ASN.1 generated by the SN1 can be transported by the MN 200 (at least in some cases, e.g. for the first configuration). ASN.1 generated by the SN2 300b can be transported by the SN1 300a (at least in some cases, e.g. for the first configuration).

The primary MN 200 or SN1 300a needs not to modify or add the UE 400's configurations for the SN2 300b. The UE 400 can be configured to establish an SRB say SRB 4 or SRB 3 in SCG 2 to enable RRC PDUs for the SN2 300b to be sent directly between the UE 400 and the SN2 300b. RRC PDUs for the SN2 300b can be transported directly to the UE 400 for the SN 300. RRC reconfiguration not requiring any coordination with the MN 200 or SN1 300a can be directly sent through SN1 300a. Alternatively, it can be delivered embedded within RRC PDUs generated by the MN 200 or SN1 300a, which is up to the network implementation. Measurement reporting for mobility within the SN2 300b can be done directly from the UE 400 to the SN2 300b if an SCG 2 SRB is configured. Support of the direct RRC PDU transmission between the UE 400 and the SN2 300b does not imply that the UE 400 has to do any reordering of RRC messages.

Figure 13:
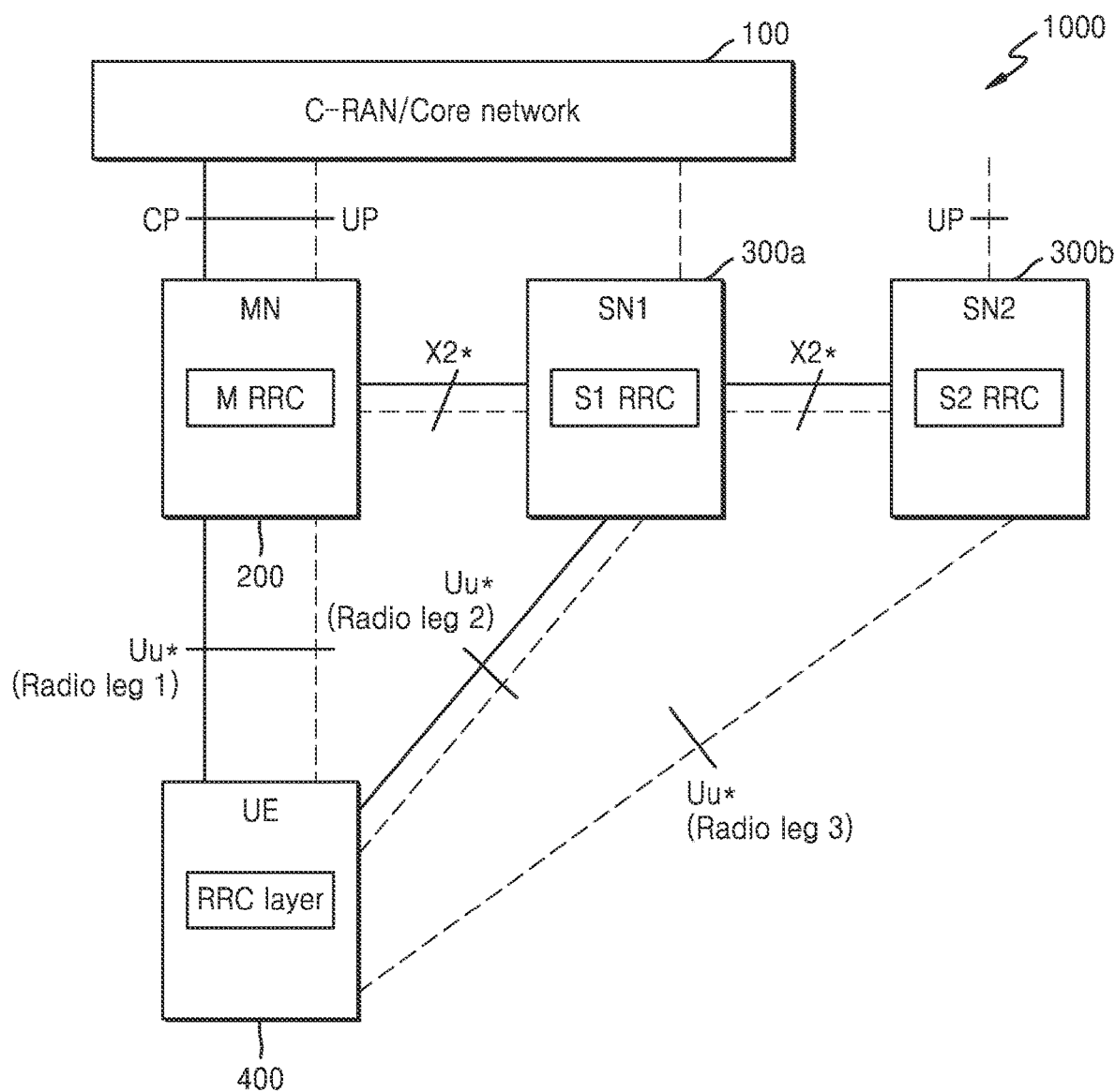
FIG. 13 illustrates a UE and a single CP connection to a C-RAN having two MNs and two SNs (Linked List Mechanism) where there is no control plane connection for an SN2 with the UE, according to an embodiment of the disclosure.

Measurement reporting for mobility within the SN2 300b can be done directly from the UE 400 to the SN2 300b if the SN2 300b's SRB is configured. It can be also sent through the SN1 300a. Additionally, another possible solution could be there will be a single CN connection towards the C-RAN 100 or Core NW as shown in FIGS. 10 and 13. The MN 200 will provide all the UP related information like bearers setup, QoS flow ID to the SN2 300*b* where the MN 200 is acting as the MN 200 for the SN2 300*b* or via the SN1 300*a* to the SN2 300*b*, where the SN1 300*a* is acting as the MN 200 for the SN2 300*b*.

Figure 12:
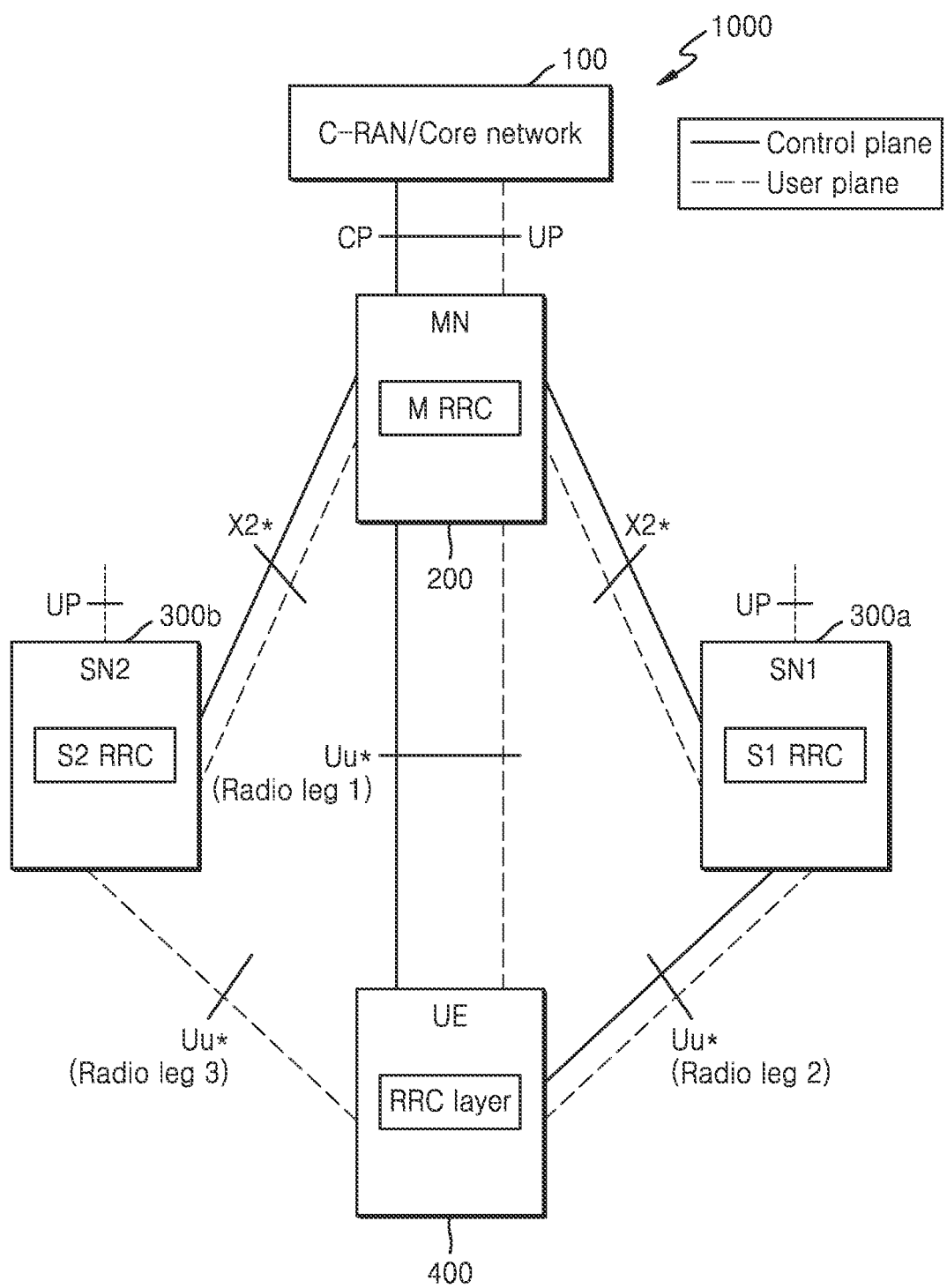
FIG. 12 illustrates a UE and a single CP connection to a C-RAN having a MN and two SNs where there is no control plane connection for the SN2 with the UE, according to an embodiment of the disclosure.

FIG. 12 illustrates the UE 400 and the single CP connection to the C-RAN 100 having the MN 200 and two SNs 300*a* and 300*b* where there is no control plane connection for the SN2 300*b* with the UE 400, according to an embodiment of the disclosure.

Referring to FIG. 12, consider a scenario of the related art, the SN2 300*b* is connected with the UE 400 only for user plane messages. In this case, the SN2 300*b* can only be used to send and receive the data only. The control setup, modification, release, or bearer setup release everything can be done through the MN 200 only. The MN 200 can decide the type of configuration and bearers. All measurements of the SN2 300*b* can be taken care of by the MN 200 and on the basis of this it can decide whether to do any of the SN2 300*b* modification, release, and setup. This kind of setup is possible when RAT is the same say NR but they are working on a different frequency range. It can also be possible in the scenario where THz can be used as a small cell and connected to 5G core NW. The CP can be common but the data path or MAC/RLC/PDCP/PHY can be different as compared to the SN1 300*a* or the MN 200. All the control messages will come through the MN 200 or the SN1 300*a*.

For the SN2 300*b*/MN 200 RRC reconfiguration requiring also MN 200/SN2 300*b*'s RRC reconfiguration, the MN 200's RRC message is delivered with an embedded SN2 300*b*'s RRC message. The SN2 300*b*'s control messages can be sent over SRB of the MN 200 or on split SRB. The SN1 300*a* or the MN 200 can co-ordinate with the SN2 300*b* to decide the measurements, the UE 400 capability, buffer size, and set the bearers accordingly. The MN 200 may coordinate with the SN 300 to decide the addition, release, modification for the SN2 300*b*. Any failure that happened at the UE 400 or NW like beam failure, radio link failure, protocol error like RLC unrecoverable, etc. on the SN2 300*b* will be reported to the MN 200. The MN 200 will decide the SN2 300*b* and try to recover the same.

FIG. 13 illustrates a UE 400 and single CP connection to a C-RAN 100 having two MN 200 and two SNs 300 (Linked List Mechanism) where there is no control plane connection for the SN2 300*b* with the UE 400, according to an embodiment of the disclosure.

Referring to FIG. 13, consider a scenario of the related art, where the SN2 300*b* is connected with the UE 400 only for the UP messages. In this case, the SN2 300*b* can only be used to send and receive the data only. The control setup, modification, release, or bearer setup release everything can be done through the SN1 300*a* or MN 200 only. The SN1 300*a* or MN 200 can decide the type of configuration and bearers. All measurements of the SN2 300*b* can be taken care by the SN1 300*a* and MN 200 and the basis of this it can decide whether to do any SN2 300*b* modification, release, setup. This kind of setup is possible when RAT is the same say NR but they are working on a different frequency range. It can also be possible in the scenario where THz can be used as a small cell and connected to 5G core NW. The CP can be common but the data path or MAC/RLC/PDCP/PHY can be different as compared to the SN1 300*a* or MN 200. All the control messages will come through MN 200 or the SN1 300*a*.

For the SN2 300*b*/MN 200 RRC reconfiguration requiring also MN 200/SN2 300*b*'s RRC reconfiguration, the MN 200's RRC message is delivered with an embedded the SN2 300*b*'s RRC message. For the SN2 300*b*/SN1 300*a*'s RRC reconfiguration requiring also SN1 300*a*/SN2 300*b*'s RRC reconfiguration, the SN1 300*a*'s RRC message is delivered with an embedded SN2 300*b*'s RRC message. The SN2 300*b*'s control messages can be sent over SCG SRB of the SN1 300*a* or on Split SRB. The SN1 300*a* or MN 200 can co-ordinate with the SN2 300*b* to decide the measurements, the UE 400 capability, buffer size, and set the bearers accordingly. Any failure happened like beam failure, radio link failure, protocol error like RLC unrecoverable, etc. on the SN2 300*b* will be reported to the SN1 300*a* or MN 200. These nodes will decide the SN2 300*b* and try to recover the same.

Figure 14:
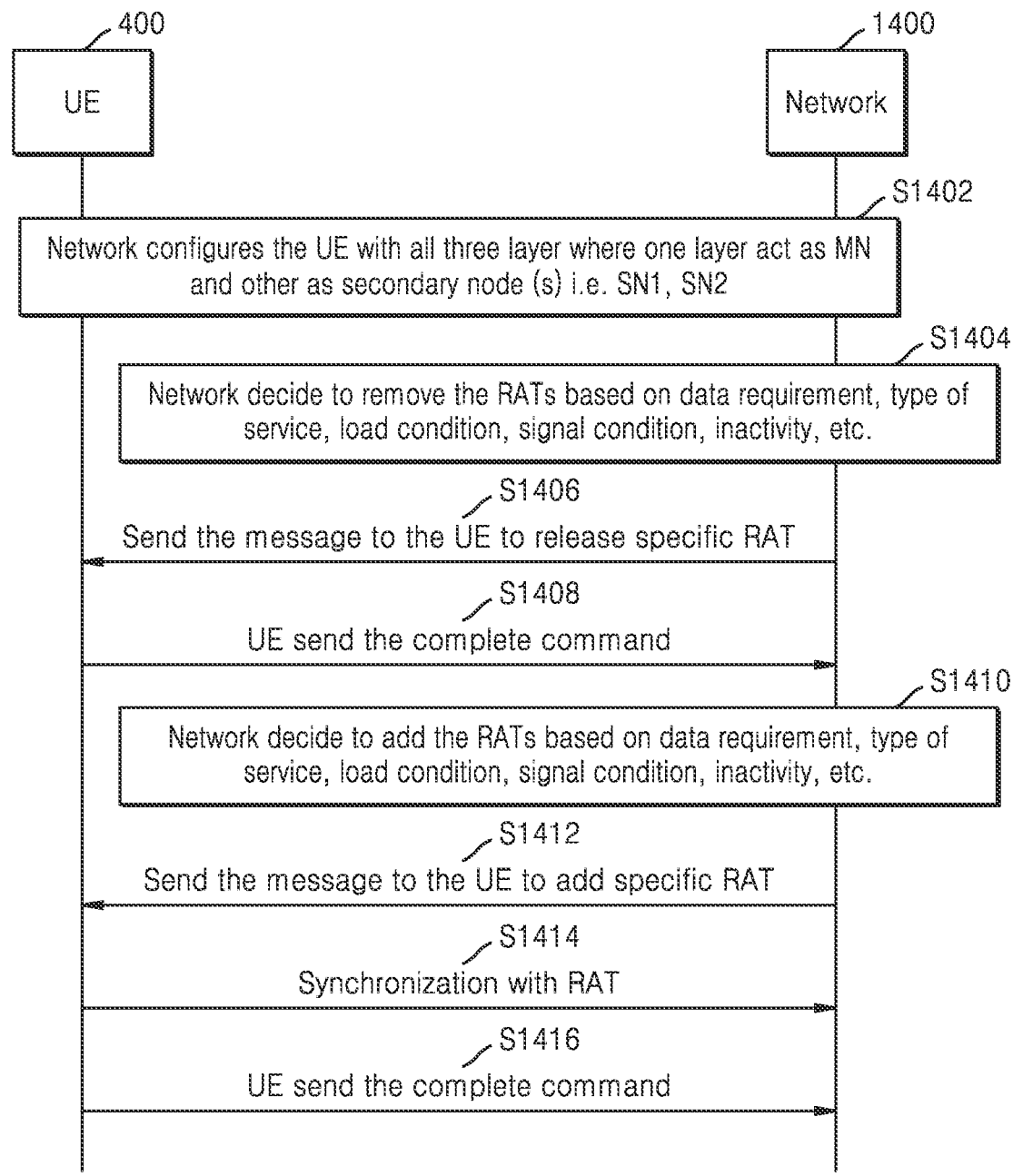
FIG. 14 is a sequence diagram illustrating a signalling overhead problem in existing systems and a solution for the signalling overhead by a proposed method, according to an embodiment of the disclosure.

FIG. 14 is a sequence diagram illustrating a signalling overhead problem in existing systems and a solution for the signalling overhead by a proposed method, according to an embodiment of the disclosure.

Referring to FIG. 14, at operation S1402, a network 1400 configures the UE 400 with all three layers where one layer act as MN and other as secondary node (s) i.e. SN1, SN2. At operation S1404, the network 1400 decides to remove the RATs based on data requirement, type of service, load condition, signal condition, inactivity, etc. The multiple RATs may be activated due to high data rate requirements, once the high data rate requirement is over, if the multiple RATs are still active this can cause high power consumption issue both at the UE 400 and the network 1400 side as it has to maintain the multiple radio links. When UE data rate requirement changes dynamically, e.g. from high to low, SN1 and/or SN2 is worth considering to be (de)activated to save network and UE energy consumption. The network 1400 can determine the same based on type of application or Buffer status reports sent by the UE 400. The other important factor is based on inactivity of data on certain link. If there is no data transfer and reception happening on certain radio link which can be pre-configured or based on network timers, the network 1400 instead of releasing the link can simply deactivate the link as it will help to reduce the signalling load, reduce the power consumption at the UE 400 and the network 1400.

Each RAT or band or frequency may be supporting specific type of services e.g. Vehicle-to-everything (V2X) services or side link services or unicast services or multicast services, etc. may or may not be supported by all RATs or frequencies. It depends upon specific deployment or operator. If the UE 400 wants to specific services or the network 1400 wants to provide specific services to the users in particular area, it can (de)activated or activated RATs or frequency based on these services, e.g. the UE 400 and the network 1400 may want to use URLLC (Ultra reliable communication) based services which is not feasible with LTE RAT but can be achieved with the help of 5G RAT, so the network 1400 at that time can decide to deactivate the LTE RAT but can activate the 5G RAT. Similarly for other services like Voice call or data rate which can be satisfied with particular RAT, there is no need to enable the multiple RATs and rest of the RATs can be deactivated or activated based on requirement.

Another important factors which helps the network 1400 to determine the activation and deactivation of RAT depends upon the load or signal condition. If for particular RAT or frequency load or signal conditions are not good, it will not help to satisfy the QOS (quality of service) requirements for specific application or service. In such cases there is no benefit in activating the multiple RATs as it can cause radio link failure or no service issues which can further impact the ongoing user data. The network 1400 can check the measurement report, Channel Quality Indicator (CQI) report, sounding reference signal to check the radio conditions. The network 1400 can determine the load condition based on assigned resources or any other existing mechanism.

At operation S1406, the network 1400 sends the message to the UE 400 to release specific RAT. At operation S1408, the network 1400 receives complete command from the UE 400. At operation S1410, the network 1400 decides to add the RATs based on data requirement, type of service, load condition, signal condition, and inactivity. The reason and parameters to determine these factors are same as mentioned in this disclosure. At operation S1412, the network 1400 sends the message to the UE 400 to add specific RAT. At operation S1414, the network 1400 receives Synchronization message with RAT from the UE 400. At operation S1416, the network 1400 receives complete command from the UE 400. The above procedure can be repeated multiple times. It may impact the below, 1. Signaling overhead and load at the network 1400 as every time the network 1400 has to add or delete RAT and has to send corresponding configuration to the UE 400 and within various NW nodes (e.g. the MN 200, the SN 300, and the C-RAN 100).
2. Latency due to addition or release of RAT impacts the user experience i.e. it can cause user interruption, if any configuration fails then interruption can be more.
3. The UE 400 battery power consumption increases. This can occur due to signaling overhead or scanning or new cells or measurements.

So we need a solution to reduce the signalling overhead and the UE 400 battery power consumption. Instead of adding and release of specific RAT, a new mechanism can be introduced as per that network (i.e. MR-MC network system 1000) will activate and deactivate or suspend/resume the RATs based on data requirement, type of service, load condition, signal condition etc.

The MR-MC network system 1000 can have more than two RATs. All these RATs need to be active for certain applications or services. Any particular RAT needs to be active or not also depends on load condition, signal condition, etc. Consider a case where three RATs are active and serving the specific device or UE 400. Due to device requirements or need for a specific application or load all the RATs can be served the UE 400 at the same time but there can be the case where there is no need of so many RATs to be active say due to data requirement or some application is closed or specific service is not needed. In those cases, the MR-MC network system 1000 will release one of the RAT by sending RRC or control messages.

If after some time based on the requirement, again there is a need to activate the MR-MC network system 1000 mode then the MR-MC network system 1000 again need to perform signaling message for the addition of new RAT. This will cause signaling overhead at the MR-MC network system 1000 and also impact the battery of the device/UE 400. To avoid this there is a need to enhance the current mechanism so that this signaling overhead can be avoided. Instead of adding and release of specific RAT, a new mechanism can be introduced as per that NW will Activate and Deactivate the RATs based on data requirement, type of service, load condition, signal condition, etc. As an example case is considered where we have MN 200 and two secondary nodes say the SN1 300*a* and the SN2 300*b* but the below procedure mentioned is applicable for other cases also.

The Radio resource controller (RRC) or the C-RAN 100 or core network will send the signaling message to the device for the addition of the SN1 300*a* and the SN2 300*b*. Once it is added it will start with data transfer and reception from both the SN1 300*a* and the SN2 300*b* or more depending on no of nodes/RATs added. Later in the case, the MR-MC network system 1000 does not want to continue the services of specific RAT due to any reason, instead of releasing it can send a deactivate command. This will help to deactivate that particular cell or SN 300 or RAT. This can be achieved through the MAC control element or some L1 indication.

The SN(s) 300 other than the MN 200 can only be activated/deactivated by the MAC Control Element received on SN 300 or MN 200. If the MAC entity is configured with one or more SN(s) 300, the network may activate and deactivate the configured SN(s) 300. Upon configuration of the SN(s) 300, the SN(s) 300 is deactivated. The configured SN(s) 300 is activated and deactivated by receiving the SN(s) 300 Activation/Deactivation MAC-CE; this can also be controlled through configuring an SN DeactivationTimer, the SN 300 the associated SN 300 is deactivated upon its expiry. The UE 400 should stop/suspend all types of data services, signals, measurements, etc. in both uplink and downlink as soon as the UE 400 receives the deactivate command for a particular secondary node/SN 300. Once the UE 400 receives the activate command for the particular SN 300 it should perform the RACH procedure for synchronization. In case the UE 400 moves out of coverage of the specific area, then NW should either release the deactivated RAT or provide the UE 400 with the latest SN 300 cell info so that the UE 400 can perform synchronization as soon as it will be activated.

This will help to reduce signaling latency and signaling load too. The same operation can be done through a suspend/resume command through the MAC control element. In the MAC-CE, the MR-MC network system 1000 should mention the SN 300 it wants to suspend or resume. On receiving the command the SN along with all Scells configured in that the SN 300 will be suspended or resumed. The SN 300'cell or RAT activation/deactivation MAC-CE of one octet is identified by a MAC PDU subheader with LCID. It has a fixed size and consists of a single octet containing seven or less than SN 300's fields and one or more R-field. The secondary node activation/deactivation MAC-CE with one octet is defined as follows.

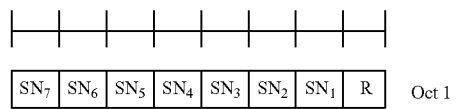

The SN 300 Activation/Deactivation MAC-CE of one octet. The way of MAC-CE can be designed as below if say only three SN(s) 300 are there. This can also be used for two SN(s) 300.

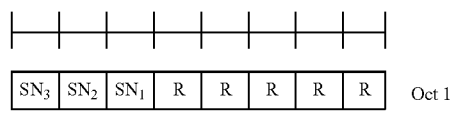

The SN 300 Activation/Deactivation MAC-CE of one octet. The SNi field is set to "0" to indicate that the SN 300 with secondary node index i shall be deactivated R: Reserved bit, set to "0", if it is set to "1" to indicate that the SN with secondary node index i shall be activated.

The method can be the activation/activation for the SN command MAC-CE is identified by a MAC subheader with LCID. There will be different LCID for activation and deactivation it has a fixed size of zero bits. On receiving the command the UE 400 will simply deactivate/activate SN1 300a or SN2 300b. The action of SN1 300a or SN2 300b depends upon the LCID value whether it is for activation or deactivation. In another method, the NW will simply send the SN 300 activation/deactivation MAC-CE which is identified by a MAC subheader with LCID. It has a fixed size of zero bits. On receiving the UE 400 will activate or deactivate the RAT or SN2 300b. The NW can also activate/deactivate the particular secondary node through the RRC message or it can also suspend/resume the secondary node through the RRC message. Once the UE 400 receives this message it will send the command to lower layers to activate and deactivate the RATs. All the above-mentioned operations will be valid for this case also.

The handover between various RATs can be performed by Activation, deactivation command so in that case there is no signaling overhead due to handover between various RATs. There is flexibility with this design as multiple RATs are involved so NW or UE 400 can transfer the data from one RAT to another in case handover decision need to be performed. For intra RAT handover, the handover decision for each node i.e. the MN 200, the SN1 300a and the SN2 300b can be taken by the C-RAN 100 entity or the MN 200 can take decision for the SN1 300a or the SN2 300b. Alternatively handover decision for the SN2 300b can be taken by the SN1 300a, in case the SN1 300a is controlling the SN2 300b. In case handover decision taken by node itself, then it can inform its MN 200 or C-RAN 100. When master node performed handover then corresponding SN 300 handover may also take place. The C-RAN 100 or NW can take decision whether it should perform inter RAT handover or activate/deactivate the various links as this can help in avoid user plane interruption during handover command.

The carrier aggregation (CA) can be configured for any RAT. This RAT can belong to the MN 200, the SN1 300a or the SN2 300b or any other secondary node 300. The carrier aggregation can be between different RATs and these can be controlled by common controller which can be C-RAN 100. The activation/deactivation of these RATs can be done through MAC control element or layer 1 commands. The master node 200 can act as Pcell and other secondary nodes can act as Scell. The MR-MC connectivity design enables the new design for carrier aggregation where it can be extended to have carrier aggregation between different RATs.

The CoMP can also be configured among the multiple RATs instead of multiple cell within the same RAT. The decision to form the CoMP can be taken by C-RAN 100 or MN 200 itself. The multiple RATs can act as RU unit and they can be controlled by C-RAN 100.

The MN 200's RAT capability: The MN 200's RAT capability should include support of the MR-MC network system 1000. The MN 200's RAT capability should include information related to the SN1 300a and the SN2 300b's RAT measurements. The SN1 300a or secondary MN 300a capability should include information related to the SN2 300b. This will help the MN 200 or the SN1 300a for modify, addition, or release of the SN2 300b. New IE needs to define in the UE 400 capability message which mentions the support of the MR-MC network system 1000.

The capability of MN 200's RAT should include information related to inter-RAT measurements for NR or 6G THz or (e) LTE. It should also include the support of the MR-MC network system 1000 between LTE, 6G, and NR or other combinations of frequency as mentioned above. There can be capabilities that could be understood by another RATs and some capabilities need not be another RATs. The use of the capability in one RAT has impacts on the other RAT but is not understood by the NW side of the other RAT. The use of the capability in one RAT has impacts on the other RAT and is understood by the NW side of the other RAT.

The synchronization and broadcast information specific to a Data BS can be sent to the MS by the Control BS when the MS needs to establish synchronization with that Data BS.

The MS when powers on searches for the available Control BSs (low-frequency bands). The Control BSs transmit the synchronization signals (for example similar to 4G/5G synchronization signals). The MS synchronizes to the Control BS based on the synchronization signals transmitted by the Control BS. This procedure can be similar to that in the existing 4G/5G systems. After performing DL synchronization with the Control BS, the MS decodes the broadcast information transmitted by the Control BS. This broadcast information contains system wide information for both low and high frequency bands. The broadcast information also contains cell specific information for the corresponding Control BS. System wide information can include frequency bands used, system bandwidth on low and high frequency bands, basic OFDM (Orthogonal Frequency Division Multiplexing) specific information (for an OFDM based system) etc. Cell specific information can include cell loading status, scheduling for broadcast information, DL/UL (Downlink/Uplink) information, BS ID, parameters for various procedures, ranging information (for Control BS), paging information etc. After decoding the relevant broadcast information, the MS performs ranging with the Control BS to establish UL synchronization. Then it performs registration with the network.

In general, THz is promising band for the next generation of wireless communication systems and can provide high data rates as required for 6G application. In case of the 6G THz standalone deployment, reliable transmission/reception in mobile would be critical due to high path loss, narrow beams, rain attenuation, etc. The lower frequencies in cellular band having robust link characteristics can be utilized together with higher frequencies in mm Wave or THz band to overcome the reliability issues in next generation wireless system. That time the MR-MC network system 1000 uses Multi-Tier deployments consist of 3 layered or RATs which is a combination of 5G and 6G system.

In an embodiment, advantages of the MR-MC network system 1000, the MR-MC network system 1000 is flexible and seamless RAT selection between 6G and 5G system, enhanced path diversity for 5G and beyond systems, minimizing service disruption in the event of blockage, connection robustness to minimize connection failures and to ensure continuous quality of services (QoS), Ultra-high reliability to ensure error-free transmission for both user plane and control plane for URLLC, Ultra-low latency to provide in-time data transmission and/or control signalling configuration for URLLC, and operators may want benefit from the existing NR deployments when deploying 6G THz in terms of aggregation, coverage, mobility and load balancing.

Figure 15:
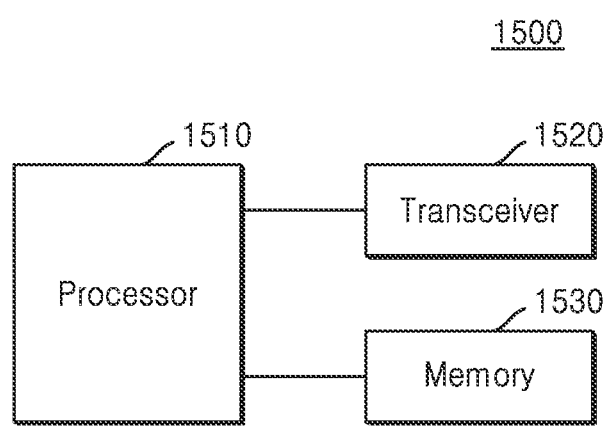
FIG. 15 illustrates a gNB according to an embodiment of the disclosure.

FIG. 15 illustrates a base station (BS) according to an embodiment of the disclosure.

The gNBs, eNBs, ng-eNB, or BSs described above may correspond to the BS 1500. In addition, the MN 200 or the SN 300 illustrated in FIG. 2 may correspond to the BS 1500.

Referring to the FIG. 15, the BS 1500 may include a processor 1510, a transceiver 1520 and a memory 1530. However, all of the illustrated components are not essential. The BS 1500 may be implemented by more or less components than those illustrated in FIG. 15. In addition, the processor 1510 and the transceiver 1520 and the memory 1530 may be implemented as a single chip according to another embodiment.

The aforementioned components will now be described in detail.

The processor 1510 may include one or more processors or other processing devices that control the proposed function, process, and/or method. Operation of the BS 1500 may be implemented by the processor 1510.

In one embodiment, the BS may determine at least one secondary node (SN) to be activated from a plurality of secondary node (SN) based on at least one of data requirement, a type of service, load condition, or the signal condition associated with the UE. The BS may transmit, to a user equipment (UE), a Radio Resource Control (RRC) message including activation field indicating whether each of the plurality of SN is to be activated or deactivated.

In one embodiment, the activation field indicates activating the determined at least one SN and deactivating the other SNs of the plurality of SN except for the determined at least one SN.

In one embodiment, the BS may transmit, to the UE, a Medium Access Control (MAC) Control Element (CE) to perform activating or deactivating each of the plurality of SN. The BS may receive, from activated SN, control information or data as a result the activated SN is activated by the UE based on the MAC CE.

In one embodiment, at least one of the RRC message including activation field or the MAC CE is transmitted when a timer is operating.

In one embodiment, the activation field corresponding to a first SN is set to 1 when the first SN is to be activated and the activation field corresponding to a second SN is set to 0 when the second SN is to be deactivated.

The transceiver 1520 may include a RF transmitter for up-converting and amplifying a transmitted signal, and a RF receiver for down-converting a frequency of a received signal. However, according to another embodiment, the transceiver 1520 may be implemented by more or less components than those illustrated in components.

The transceiver 1520 may be connected to the processor 1510 and transmit and/or receive a signal. The signal may include control information and data. In addition, the transceiver 1520 may receive the signal through a wireless channel and output the signal to the processor 1510. The transceiver 1520 may transmit a signal output from the processor 1510 through the wireless channel.

The memory 1530 may store the control information or the data included in a signal obtained by the BS 1500. The memory 1530 may be connected to the processor 1510 and store at least one instruction or a protocol or a parameter for the proposed function, process, and/or method. The memory 1530 may include read-only memory (ROM) and/or random access memory (RAM) and/or hard disk and/or CD-ROM and/or DVD and/or other storage devices.

Figure 16:
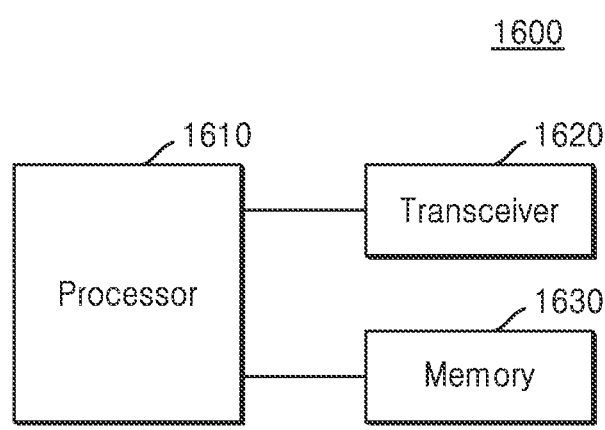
FIG. 16 illustrates a user equipment (UE) according to an embodiment of the disclosure.

FIG. 16 illustrates a user equipment (UE) according to an embodiment of the disclosure.

The UEs described above may correspond to the UE 1600. For example, the UE 400 illustrated in FIG. 2 may correspond to the UE 1600.

Referring to the FIG. 16, the UE 1600 may include a processor 1610, a transceiver 1620 and a memory 1630. However, all of the illustrated components are not essential. The UE 1600 may be implemented by more or less components than those illustrated in FIG. 16. In addition, the processor 1610 and the transceiver 1620 and the memory 1630 may be implemented as a single chip according to another embodiment.

The aforementioned components will now be described in detail.

The processor 1610 may include one or more processors or other processing devices that control the proposed function, process, and/or method. Operation of the UE 1600 may be implemented by the processor 1610.

In one embodiment, the UE may receive, from a base station (BS), a Radio Resource Control (RRC) message including activation field indicating whether each of the plurality of SN is to be activated or deactivated. The UE may identify at least one activated SN based on the RRC message including activation field. The UE may activate the identified at least one activated SN. The at least one activated SN is determined by the BS based on at least one of data requirement, a type of service, load condition, or the signal condition associated with the UE.

In one embodiment, the activation field indicates activating the determined at least one SN and deactivating the other SNs of the plurality of SN except for the determined at least one SN.

In one embodiment, the UE may receive, from the BS, a Medium Access Control (MAC) Control Element (CE) to perform activating or deactivating each of the plurality of SN. The UE may activate at least one SN and deactivate the other SN based on the MAC CE.

In one embodiment, at least one of the RRC message including activation field or the MAC CE is transmitted when a timer is operating.

In one embodiment, the activation field corresponding to a first SN is set to 1 when the first SN is to be activated and the activation field corresponding to a second SN is set to 0 when the second SN is to be deactivated.

The transceiver 1620 may include a RF transmitter for up-converting and amplifying a transmitted signal, and a RF receiver for down-converting a frequency of a received signal. However, according to another embodiment, the transceiver 1620 may be implemented by more or less components than those illustrated in components. The transceiver 1620 may be connected to the processor 1610 and transmit and/or receive a signal. The signal may include control information and data. In addition, the transceiver 1620 may receive the signal through a wireless channel and output the signal to the processor 1610. The transceiver 1620 may transmit a signal output from the processor 1610 through the wireless channel.

The memory 1630 may store the control information or the data included in a signal obtained by the UE 1600. The memory 1630 may be connected to the processor 1610 and store at least one instruction or a protocol or a parameter for the proposed function, process, and/or method. The memory 1630 may include read-only memory (ROM) and/or random access memory (RAM) and/or hard disk and/or CD-ROM and/or DVD and/or other storage devices.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cloud/centralized radio access network (C-RAN) in a wireless communication system, the C-RAN comprising:
a transceiver;
memory storing one or more computer programs; and
one or more processors communicatively coupled to the transceiver and the memory,
wherein the one or more computer programs include computer-executable instructions that, when executed by the one or more processors individually or collectively, cause the C-RAN to:
determine, by the C-RAN connected directly to at least one secondary node (SN), the at least one SN to be activated from a plurality of secondary nodes (SNs) based on at least one of data requirement, a type of service, a load condition, or a signal condition associated with a user equipment (UE),
transmit, to the UE, a radio resource control (RRC) message comprising an activation field indicating whether each of the plurality of SNs is to be activated or deactivated, and
transmit, to the UE, a medium access control (MAC) control element (CE) to perform activating or deactivating of each of the plurality of SNs,
wherein each non-reserved bit of the MAC-CE to perform the activating or the deactivating of each of the plurality of SNs represents a SN the UE activates or deactivates,
wherein the activation field indicates activating the determined at least one SN and deactivating other SNs of the plurality of SNs except for the determined at least one SN, and
wherein the activation field corresponding to a first SN is set to 1 when the first SN is to be activated and the activation field corresponding to a second SN is set to 0 when the second SN is to be deactivated.

2. The C-RAN of claim 1, wherein the one or more computer programs further include computer-executable instructions that, when executed by the one or more processors individually or collectively, cause the C-RAN to:
receive, from activated SN, control information or data as a result the activated SN is activated by the UE based on the MAC CE.

3. The C-RAN of claim 1, wherein at least one of the RRC message comprising the activation field or the MAC CE is transmitted when a timer is operating.

4. A user equipment (UE) in a wireless communication system, the UE comprising:
a transceiver;
memory storing one or more computer programs; and
one or more processors communicatively coupled to the transceiver and the memory,
wherein the one or more computer programs include computer-executable instructions that, when executed by the one or more processors individually or collectively, cause the UE to:
receive, from a base station (BS), a radio resource control (RRC) message including an activation field indicating whether each of a plurality of secondary nodes (SNs) is to be activated or deactivated,
identify at least one activated SN based on the RRC message including the activation field,
receive, from the BS, a medium access control (MAC) control element (CE) to perform activating or deactivating each of the plurality of SNs, and
activate the identified at least one activated SN based on the MAC CE,
wherein the at least one activated SN is determined by the BS based on at least one of data requirement, a type of service, load condition, or a signal condition associated with the UE,
wherein each non-reserved bit of the MAC-CE to perform the activating or the deactivating of each of the plurality of SNs represents a SN the UE activates or deactivates,
wherein the activation field indicates activating the determined at least one SN and deactivating other SNs of the plurality of SNs except for the determined at least one SN, and
wherein the activation field corresponding to a first SN is set to 1 when the first SN is to be activated and the activation field corresponding to a second SN is set to 0 when the second SN is to be deactivated.

5. The UE of claim 4, wherein the one or more computer programs further include computer-executable instructions that, when executed by the one or more processors individually or collectively, cause the UE to:
activate at least one SN and deactivate the other SNs based on the MAC CE.

6. The UE of claim 4, wherein at least one of the RRC message including the activation field or the MAC CE is transmitted when a timer is operating.

* * * * *